US011652827B2

(12) United States Patent
Overby et al.

(10) Patent No.: US 11,652,827 B2
(45) Date of Patent: May 16, 2023

(54) VIRTUALIZED INTRUSION DETECTION AND PREVENTION IN AUTONOMOUS VEHICLES

(71) Applicant: NVIDIA Corporation, San Jose, CA (US)

(72) Inventors: Mark Overby, Bothell, WA (US); Rick Dingle, Bleadon (GB); Nicola Di Miscio, Ely (GB); Varadharajan Kannan, Bristol (GB); Yong Zhang, Hampshire (GB); Francesco Saracino, Kenynsham (GB)

(73) Assignee: NVIDIA Corporation, Santa Clara, CA (US)

( * ) Notice: Subject to any disclaimer, the term of this patent is extended or adjusted under 35 U.S.C. 154(b) by 825 days.

(21) Appl. No.: 16/435,364

(22) Filed: Jun. 7, 2019

(65) Prior Publication Data

US 2019/0379683 A1  Dec. 12, 2019

Related U.S. Application Data

(60) Provisional application No. 62/682,803, filed on Jun. 8, 2018.

(51) Int. Cl.
*H04L 29/06* (2006.01)
*H04L 9/40* (2022.01)
(Continued)

(52) U.S. Cl.
CPC ...... *H04L 63/1416* (2013.01); *G06F 9/45558* (2013.01); *G06F 13/4068* (2013.01);
(Continued)

(58) Field of Classification Search
CPC ............ H04L 2209/38; H04L 63/1408; H04L 61/2585; H04L 63/14; H04L 2209/76;
(Continued)

(56) References Cited

U.S. PATENT DOCUMENTS 8,079,030 B1 12/2011 Satish et al.
10,289,469 B2 5/2019 Fortino et al.
(Continued)

FOREIGN PATENT DOCUMENTS

CN    104994150 B * 4/2018 .......... G06F 9/5077
DE    102018010323 A1 * 11/2019
(Continued)

OTHER PUBLICATIONS

International Preliminary Report on Patentability received for PCT Application No. PCT/US2019/036163, dated Dec. 17, 2020, 11 pages.
(Continued)

*Primary Examiner* — Tri M Tran
(74) *Attorney, Agent, or Firm* — Taylor English Duma L.L.P.

(57) ABSTRACT

Various approaches are disclosed to virtualizing intrusion detection and prevention. Disclosed approaches provide for an embedded system having a hypervisor that provides a virtualized environment supporting any number of guest OSes. The virtualized environment may include a security engine on an internal communication channel between the guest OS and a virtualized hardware interface (e.g., an Ethernet or CAN interface) to analyze network traffic to protect the guest OS from other guest OSes or other network components, and to protect those network components from the guest OS. The security engine may be on a different partition than the guest OS and the virtualized hardware interface providing the components with isolated execution environments that protect against malicious code execution. Each guest OS may have its own security engine customized for the guest OS to account for what is typical or expected traffic for the guest OS.

20 Claims, 22 Drawing Sheets

(51) Int. Cl.

| | |
|---|---|
| *G06F 9/455* | (2018.01) |
| *H04L 9/32* | (2006.01) |
| *G06N 20/00* | (2019.01) |
| *G06F 13/40* | (2006.01) |
| *H04L 12/40* | (2006.01) |
| *H04L 47/24* | (2022.01) |
| *H04L 61/2585* | (2022.01) |
| *G06F 21/60* | (2013.01) |
| *H04L 67/12* | (2022.01) |
| *H04L 9/00* | (2022.01) |

(52) U.S. Cl.
CPC ........... *G06N 20/00* (2019.01); *H04L 9/3265* (2013.01); *H04L 12/40* (2013.01); *H04L 12/40013* (2013.01); *H04L 47/24* (2013.01); *H04L 61/2585* (2013.01); *H04L 63/1425* (2013.01); *H04L 63/1441* (2013.01); *G06F 21/602* (2013.01); *G06F 2009/45587* (2013.01); *G06F 2009/45595* (2013.01); *H04L 9/50* (2022.05); *H04L 63/1458* (2013.01); *H04L 63/166* (2013.01); *H04L 67/12* (2013.01); *H04L 2012/40215* (2013.01); *H04L 2012/40273* (2013.01)

(58) Field of Classification Search
CPC ............... H04L 9/002; H04L 12/40013; H04L 67/2842; H04L 67/12; H04L 63/1425; H04L 2012/40215; H04L 9/14; H04L 2209/84; H04L 67/30; H04L 12/4641; H04L 2012/40273; H04L 63/1416; H04L 63/1458; H04L 61/2015; H04L 2209/805; H04L 63/20; H04L 63/1441; H04L 67/10; H04L 63/166; H04L 67/322; H04L 12/40; H04L 9/3265; H04L 61/2514; H04L 47/24; H04L 9/3247; G06F 2009/45595; G06F 13/4068; G06F 9/45533; G06F 9/45558; G06F 21/53; G06F 21/602; G06F 21/606; G06F 2009/45587; G06N 3/08; G06N 3/063; G06N 3/0454; G06N 20/00; H04W 12/121; H04W 4/40; H04W 12/122; H04W 4/48

See application file for complete search history.

(56) References Cited

U.S. PATENT DOCUMENTS

| | | | |
|---|---|---|---|
| 10,885,698 B2 | 1/2021 | Muthler et al. | |
| 2009/0254990 A1 | 10/2009 | McGee | |
| 2014/0137180 A1* | 5/2014 | Lukacs ................... | G06F 21/53 726/1 |
| 2014/0237537 A1 | 8/2014 | Manmohan et al. | |
| 2014/0317737 A1 | 10/2014 | Shin et al. | |
| 2015/0304355 A1* | 10/2015 | Voit ........................ | H04L 63/20 726/1 |
| 2016/0321074 A1 | 11/2016 | Hung et al. | |
| 2018/0121247 A1* | 5/2018 | Kaul ................... | G06F 9/45558 |

FOREIGN PATENT DOCUMENTS

| | | |
|---|---|---|
| EP | 2892199 A1 | 7/2015 |
| NO | 2018065973 A1 | 4/2018 |
| WO | 2014130328 A1 | 8/2014 |
| WO | 2017013622 A1 | 1/2017 |

OTHER PUBLICATIONS

International Preliminary Report on Patentability received for PCT Application No. PCT/US2019/036159, dated Dec. 17, 2020, 12 pages.
International Search Report and Written Opinion dated Aug. 29, 2019 in International Patent Application No. PCT/US2019/036163, 17 pages.
International Search Report and Written Opinion dated Oct. 4, 2019 in International Patent Application No. PCT/US2019/036159, 17 pages.
"Methodology of Using a Single Controller (ECU) for a Fault-Tolerant/Fail-Operational Self-Driving System", U.S. Appl. No. 62/524,283, filed Jun. 23, 2017.
"Systems and Methods for Safe and Reliable Autonomous Vehicles", U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles" U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Video Prediction Using Spatially Displaced Convolution", U.S. Appl. No. 62/647,545, filed Mar. 23, 2018.
"Geometric Shadow Filter for Denoising Ray-Traced Shadows", U.S. Appl. No. 62/644,385, filed Mar. 17, 2018.
"Energy Based Reflection Filter for Denoising Ray-Traced Glossy Reflections", U.S. Appl. No. 62/644,386, filed Mar. 17, 2018.
"Distance Based Ambient Occlusion Filter for Denoising Ambient Occlusions", U.S. Appl. No. 62/644,601, filed Mar. 19, 2018.
"Adaptive Occlusion Sampling of Rectangular Area Lights with Voxel Cone Tracing", U.S. Appl. No. 62/644,806, filed Mar. 19, 2018.
"System and Methods for Advanced AI-Assisted Vehicles", U.S. Appl. No. 62/648,358, filed Mar. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"Automotive Security Best Practices: recommendations for security and privacy in the era of the next-generation car", published by McAfee, Jun. 2016. https://www.mcafee.com/enterprise/en-us/assets/white-papers/wp-automotive-security.pdf.
Pölzbauer, Florian et al., "Analysis and Optimization of Message Acceptance Filter Configurations for Controller Area Network (CAN)", In Proceedings of RTNS '17, Grenoble, France, Oct. 4-6, 2017, 10 pages. https://doi.org/10.1145/3139258.3139266.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US

(56) References Cited

OTHER PUBLICATIONS

Department of Transportation, and the Society of Automotive Engineers (SAE), Standard No. J3016-201806, pp. 1-35 (Jun. 15, 2018).
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
Invitation to pay additional fees received for PCT Application No. PCT/US2019/036159, dated Aug. 29, 2019, 11 pages.
Restriction Requirement dated Dec. 21, 2021 in U.S. Appl. No. 16/435,337, 7 pages.
"Programmable Vision Accelerator", U.S. Appl. No. 15/141,703, filed Apr. 28, 2016.
"Reliability Enhancement Systems and Methods", U.S. Appl. No. 15/338,247, filed Oct. 28, 2016.
Non-Final Office Action dated Jan. 24, 2022, in U.S. Appl. No. 16/435,337, 22 pages.

* cited by examiner

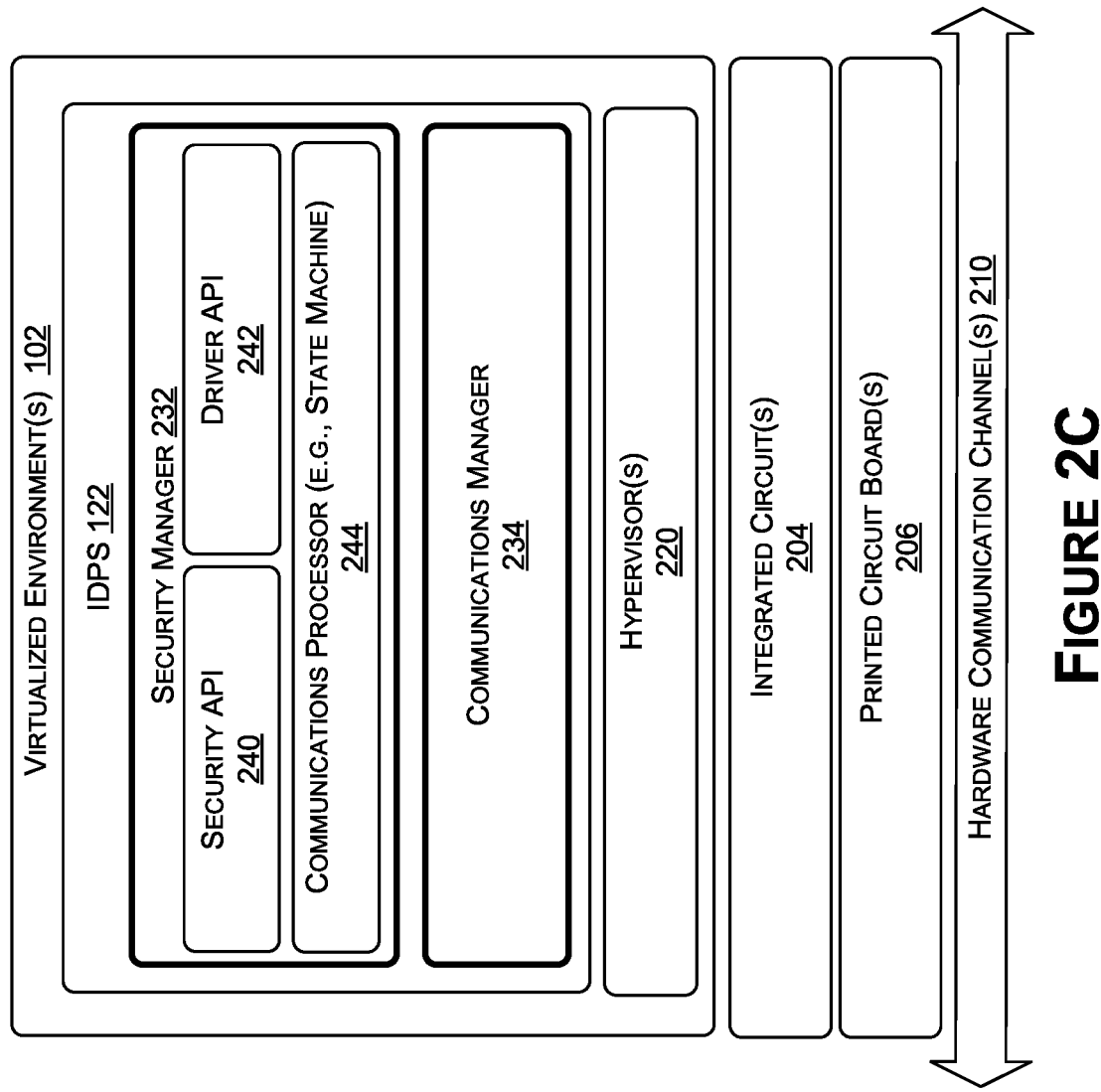

VIRTUALIZED INTRUSION DETECTION AND PREVENTION IN AUTONOMOUS VEHICLES

CROSS-REFERENCE TO RELATED APPLICATIONS

This application claims the benefit of U.S. Provisional Application No. 62/682,803, filed on Jun. 8, 2018, which is hereby incorporated by reference in its entirety.

BACKGROUND

Interfaces of modern vehicles enable internet traffic to and from the vehicles, resulting in modern connected vehicles being exposed to a broad range of cyber-attacks. For example, a modern vehicle may include a telematics control unit (TCU) that provides the vehicle with an internet connected network, such as an Ethernet network. An electronic control unit (ECU) having a single OS may be on the network to power In-Vehicle Infotainment (IVI) systems, Adaptive Driver Assistance Systems (ADAS), dashboards, and head units of the vehicle. A breach of the TCU may allow a malicious party to perform such attacks as remote code execution using the OS to compromise the safety of vehicle occupants. For example, the malicious party may access and control ECUs or other devices on vehicle busses of the vehicle, such as those supporting Controller Area Network (CAN), Local Interconnect Network (LIN), FlexRay, or Ethernet Audio Video Bridging (eAVB) protocols. Cyber security is especially critical in those vehicles featuring advanced electronic systems and autonomous driving capabilities, where a breach may allow remote influence or control on the operation of a vehicle.

To protect against cyber-attacks, conventional systems have relied upon the limited features within the OS to filter out malicious traffic. However, these systems may be susceptible to breach and difficult to secure due to the complexity of network stacks, which often have vulnerabilities. To further enhance security, conventional systems have also incorporated a stateful firewall into the TCU. However, the firewall in these systems may also be susceptible to breach and difficult to secure, as TCUs also have vulnerable network stacks. Once the TCU is breached, the OS is essentially compromised as interfaces on the inside of the vehicle are treated as trusted interfaces.

SUMMARY

Embodiments of the present disclosure relate to virtualized intrusion detection and prevention in autonomous vehicles. More specifically, the present disclosure provides various inventive concepts that may be used to implement an Intrusion Detection and Prevention System (IDPS) that is capable of supporting multiple operating systems (OSes) on an embedded system while leveraging virtualization technologies.

Disclosed approaches provide for an embedded system (e.g., an ECU) having a hypervisor that provides a virtualized environment supporting any number of guest OSes. Rather than only relying on an OS or TCU to protect against cyber security attacks, the virtualized environment may include a security engine on an internal communication channel between the guest OS and a hardware interface (e.g., an Ethernet or CAN interface). The security engine may analyze network traffic to protect the guest OS from other guest OSes or other network components, and to protect those network components from the guest OS. The security engine may be on a different partition than the guest OS providing the components with isolated execution environments that protect against malicious code execution. In embodiments, each guest OS may have its own security engine customized for the guest OS to account for what is typical or expected traffic for the guest OS. The security engines may be implemented in a security manager on a shared partition.

In further respects, the hardware interface used by a guest OS may be virtualized and included on a separate partition than the security engine to further isolate the security engine from the hardware interface. Virtualized network interfaces may include a para-virtualized driver so that from the perspective of the guest OS, it is communicating directly with external components. The virtualized network interfaces may be configured so multiple guest OSes may share a physical network interface and may be implemented in a communications manager on a shared partition. The communications manager may provide network perimeter security features, such as: distributed denial-of-service (DDOS) resistance (e.g., with the security manager), traffic filtering, stateless firewall, and restricted cone connection management. To protect against a network attack consuming the network resources of the physical hardware interface, the disclosure provides approaches to preserving resources for unaffected communication channels using QoS parameters.

BRIEF DESCRIPTION OF THE DRAWINGS

The present systems and methods for virtualized intrusion detection and prevention in autonomous vehicles is described in detail below with reference to the attached drawing figures, wherein:

FIG. 2C is a block view of an example layered architecture that may be used to implement an IDPS with a focus on a security manager and a communications manager of the IDPS, in accordance with some embodiments of the present disclosure;

DETAILED DESCRIPTION

Figure 1:
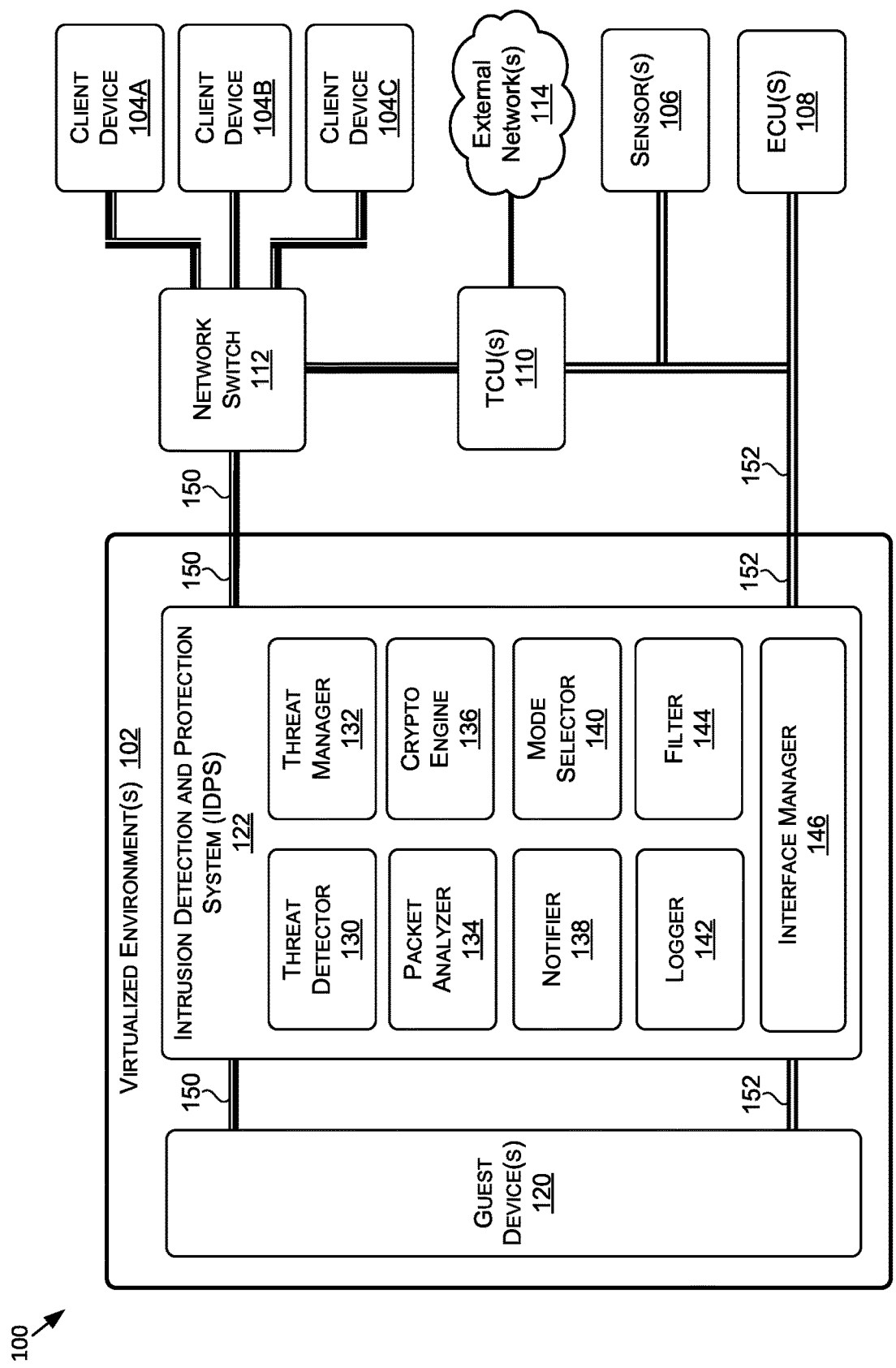
FIG. 1 is a block diagram showing an example of an operating environment that includes an intrusion detection and protection system (IDPS), in accordance with some embodiments of the present disclosure.

The present disclosure relates to virtualized intrusion detection and prevention in autonomous vehicles. More specifically, the present disclosure provides various inventive concepts that may be used to implement an Intrusion Detection and Prevention System (IDPS) that is capable of supporting multiple operating systems (OSes) on an embedded system while leveraging virtualization technologies.

Although the present disclosure may be described with respect to an example autonomous vehicle 1200 (alternatively referred to herein as "vehicle 1200" or "autonomous vehicle 1200," an example of which is described herein with respect to FIGS. 12A-12D, this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for intrusion detection and prevention in a computing system.

Disclosed approaches provide for an embedded system (e.g., an ECU) having a hypervisor that provides a virtualized environment supporting any number of guest OSes. The embedded system may protect guest OSes and various network interfaces thereof from internal or external breaches by leveraging virtualization technologies. In some respects, the guest OS may use an internal communication channel (which may also be referred to as a virtual link) to a network interface to access devices on an external vehicle bus (e.g., a CAN bus) containing ECUs. Rather than only relying on the OS or TCU to protect against cyber security attacks, the virtualized environment may include a security engine on a different internal communication channel between the guest OS and a virtualized hardware interface (e.g., an Ethernet interface that provides internet connectivity to the guest OS).

The security engine may monitor communications between the guest OS and the virtualized hardware interface for potential security events and may execute a remedial action upon detecting a security event, such as blocking a message, notifying the guest OS, logging the incident, or initiating a safe mode of operation. A security engine may implement various threat detection features, such as anomaly detection, malware detection, cyber-attack detection, Deep Packet Inspection (DPI), Transport Layer Security (TLS) inspection, stateful firewall application, cryptographic authentication, message form verification and/or security incident logging. The security engine and the virtualized hardware interface may be on one or more partitions that are separate from a partition of the guest OS. This provides the components with isolated execution environments, such that if the network stack of the virtualized hardware interface is breached, code cannot be executed on the guest OS to maliciously access sensitive devices on the external vehicle bus.

Disclosed approaches allow for protection of any number of guest OSes, as well as external network components by each security engine. For example, where multiple guest OSes are employed, the security engine may be used to protect a guest OS from other guest OSes by monitoring communications between guest OSes. In addition, because the security engine is on a different partition than the guest OSes, it remains secure if either of the guest OSes becomes compromised. In embodiments, each guest OS may have its own security engine on an internal communication channel customized to monitor communications to and from the guest OS. The security engines may each be part of a security manager on a shared partition. In a non-limiting example, a security engine may have access to all communications to or from a guest OS over an internet connected network (or vehicle bus network), with components both internal to the embedded system and/or external to the embedded system. When a message is sent from one guest OS to another, it may be monitored by the security engine of each OS to account for what is typical or expected traffic for each guest OS over the network. This approach may be used to implement communication channel specific machine learning for threat detection.

In some embodiments, multiple guest OSes of the embedded system may share a physical network interface to an external hardware communication channel of the vehicle—such as an Ethernet channel or vehicle bus—through a communications manager of the virtualized environment. The communications manager may include the virtualized hardware interface implemented using a para-virtualized driver interface with a virtual router that connects the guest OSes to the physical network interface. Thus, if a network attack—such as a Denial-of-Service (DoS) attack—occurs over one of the communication channels, it may waste the network resources of the other communication channels. The security engines of the virtualized environment may be used to preserve network resources for the other communication channels. To do so, when a security event is detected over a communication channel, the security engine for that channel may determine and enforce quality of service (QoS) parameters to limit network resources (e.g., bandwidth) available to the communication channel relative to the other communication channels. In some embodiments, the communications manager may act to consolidate the QoS parameters of the communication channels to QoS parameters of the external network so that the relative network resources of the communication channels flow from the shared interface to the external infrastructure of the system. For example, the communications manager may assign a QoS tag to outbound network communications based on the guest OS sending the network communication (e.g., using a Class of Service (CoS) of 802.1Q).

The communications manager may provide network perimeter security features, such as: distributed denial-of-service (DDOS) resistance (e.g., with the security manager), traffic filtering, stateless firewall application, and restricted cone connection management. For example, the communications manager may apply a reverse cone Network Address Translation (NAT) to the virtualized hardware interface (which may also be referred to as a restricted Cone NAT). From the perspective of each guest OS, the communication channel may appear as dedicated network connection with the NAT connecting to a dynamic Internet Protocol (IP) address. The reverse cone NAT may only allow an inbound connection to a port to which an outbound connection has already been established. This prevents an inbound connection from an IP address to a guest OS behind the NAT unless the guest OS has first sent a packet to the IP address. Thus, the embedded system may have additional security against inbound communications over the network interface. These and other inventive aspects are disclosed within the present application.

With reference to FIG. 1, FIG. 1 is a block diagram showing an example of an operating environment 100 that includes an intrusion detection and protection system (IDPS) 122, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the operating environment 100 may be implemented on one or more instances of the computing device 1300 of FIG. 13.

The operating environment 100 may include, among other elements, one or more virtualized environments 102, one or more client devices 104A, 104B, and 104C, one or more sensors 106, one or more electronic control units (ECUs) 108, and one or more telematics control units (TCUs) 110. The virtualized environment 102 includes the IDPS 122 and one or more guest devices 120.

The IDPS 122 may be provided to protect the operating environment 100 from cyber-attacks, which may be perpetrated by exploiting networked end-points within vehicle 1200 or other systems in which the IDPS 122 is deployed. Examples of the end-points include the client device 104A, the client device 104B, the client device 104C, the network switch 112, the TCU 110, the sensors 106, the ECUs 108, the guest devices 120, and/or other network devices. The operating environment 100 is shown as including one or more communication channels 150 and one or more communication channels 152, which may facilitate network communications between the network devices within the vehicle 1200.

The communication channel 152 may correspond to a vehicle bus network, such as Controller Area Network (CAN), Local Interconnect Network (LIN), FlexRay, or an Ethernet Audio Video Bridging (eAVB). The vehicle bus network may be a specialized internal communications network that interconnects components inside the vehicle 1200 that are used for vehicle control (e.g., driving and/or safety systems). The vehicle bus network may accommodate for such special requirements for vehicle control as assurance of message delivery, of non-conflicting messages, of minimum time of delivery, of Electromagnetic Field (EMF) noise resilience, and of redundant routing.

As shown, the vehicle bus network may include the ECUs 108, the sensors 106, one or more of the guest devices 120, and the TCU 110. Examples of the ECUs 108 include one or more actuator ECUs, such as those used to control the brake actuators 1248, the steering actuators 1256, and/or other actuators used by any of the various driving and/or safety systems of the vehicle 1200. Examples of the sensors 106 include global navigation satellite systems sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s) 1240, brake sensor(s) (e.g., as part of the brake sensor system 1246), and/or other sensor types used by any of the various driving and/or safety systems of the vehicle 1200.

The communication channel 150 may correspond to an internet protocol (IP) network, such as an Ethernet network. The IP network(s) may interconnect components inside the vehicle 1200 that are used for In-Vehicle Infotainment (IVI) systems, Advanced Driver Assistance Systems (ADAS), dashboards, or head units of a vehicle. As shown, the IP network may include the client device 104A, the client device 104B, the client device 104C, one or more of the guest devices 120, the network switch 112, and the TCU 110.

The client device 104A, the client device 104B, and the client device 104C may, for example, be thin clients controlled by one or more of the guest devices 120 over the communication channel 150 and/or by one or more external entities over the external network(s) 114. As an example, the client device 104A may include a cluster client, such as for displaying an electronic instrument cluster and/or digital instrument panel of the vehicle 1200. Examples of information that may be displayed include speed levels, gas levels, power levels, battery levels, notifications, autopilot information, driver assist information, etc. The client device 104B may include an IVI client, such as for audio, video, music, phone, etc. The client device 104C may include a Heads Up Display (HUD) client, such as for displaying autopilot and/or driver assist HUDs. These are just some examples of potential functionalities of the client devices and any number of client devices may be used for any combination of the various functionalities.

The TCU 110 may be an ECU that controls communications between the vehicle 1200 and one or more external entities, such as over one or more external networks 114. The TCU 110 may support communications between the vehicle 1200 and the external entities via any of a variety of interconnection interfaces, examples of which include Near-Field Communication (NFC), Vehicle-to-everything (V2X), Car2Car, Cellular, Wireless Fidelity (WiFi), Ethernet, Universal Serial Bus (USB), and Bluetooth (BT). As examples, the TCU may provide for wireless tracking and diagnostics of the vehicle 1200, consumer device integration (e.g., smartphone or tablet), or vehicle-to-vehicle communications.

In various embodiments, the external networks 114 may comprise an IP network, such as the internet. For example, the TCU 110 may provide internet connectivity to one or more of the client devices 104A, the client devices 104B, the client devices 104C, and/or the guest devices 120 over the communication channels 150.

The guest devices 120 may be used to control the IVI systems, ADAS, dashboards, or head units of the vehicle 1200, which may involve controlling one or more of the client devices 104A, 104B, or 104C. As shown, each of the guest devices 120 may include a connection to the communication channel(s) 150 and/or the communication channel(s) 152. For example, a guest device 120 that is used to power Artificial Intelligence (AI)-assisted vehicle control systems used in autonomous vehicle (AV) systems and ADAS of the vehicle 1200 may include connections to both the communication channel(s) 150 and/or the communication channel(s) 152. The communication channel(s) 150 may provide the guest devices 120 with internet connectivity (via the TCU 110), for example, to download High Definition maps used for self-driving features of the vehicle 1200, software updates, media for streaming, and more. The communication channel(s) 152 may provide the guest devices 120 with access to information from the ECUs 108 and the sensors 106, as well as with the ability to control and/or drive the vehicle via the ECUs.

As indicated in FIG. 1, the external networks 114 over the interconnection interfaces of the vehicle 1200 (e.g., via the TCU 110) may provide a malicious party with access to the communication channel 150 and/or the communication channel 152. For example, a malicious party may attempt to breach the TCU 110 and one or more of the guest devices 120 to control devices, attack devices (e.g., via Distributed Denial-of-Service (DDoS) attacks), or otherwise interfere with the operation of the various end-points of the network(s).

The IDPS 122 may protect the various components of vehicle 1200 from one another and from external entities. To this effect, the IDPS 122 may include a threat detector 130, a threat manager 132, a packet analyzer 134, a cryptography engine 136, a notifier 138, a mode selector 140, a logger 1342, a filter 144, and an interface manager 146. As an overview, the interface manager 146 may be configured to manage communications between components, such as between the guest devices 120, and/or the guest devices 120 and entities external to the virtualized environment 102. The threat detector 130 may be configured to monitor the communications over one or more of the communication channels 150 and/or the communication channel 152 for potential threats, and the threat manager 132 is configured to implement responses to the monitoring.

To monitor communications, the threat detector 130 may use the packet analyzer 134 and/or the cryptography engine 136. The packet analyzer 134 may be configured to analyze data representative of the communications, and the cryptography engine 136 may be used to decrypt the data for the analysis and/or encrypt the communications for transmission. The cryptography engine 136 may also be used to encrypt and/or decrypt other data, such as configuration files, which may include user configurable threat profiles having detection settings on how the threat detector 130 detects threats (e.g., by threat type) and/or response settings (for executing a security response which may include one or more remedial actions) on how the threat manager 132 responds to detected threats (e.g., by threat type).

The packet analyzer 134 may employ Transport Layer Security (TLS) inspection for encrypted data traffic. TLS inspection may be used to protect against the improper use of encrypted communications between the virtualized environment 102 (e.g., the embedded system) and the external world. For example, a malicious party may perform an attack using TLS or another type of encrypted connection. Conventional security appliances are unable to examine the data that is encrypted. To enable examination of such encrypted data, the package analyzer 134 may include a TLS inspector (as a TLS middleman) to open up the data so the threat detector 130 may ensure it is not being used as an attack vector. For example, the TLS inspector may allow the threat detector 130 to analyze the encrypted packets and ensure they are correctly formed, as an incorrectly formed packet may be used to exploit vulnerabilities in TLS implementations.

Deep Packet Inspection (DPI) and Anti-Malware may be used to protect against anomalies in any of the communication channels shall anomalies overcome the boundary countermeasures. Cryptography may be used to prevent loss of privacy or confidentiality in sensitive data exchanged in the system and between the system and the external world.

The threat detector 130 may detect threats using any suitable approach. The threat detector 130 may enforce authorization, authentication, and/or entitlement policies over the communication channels. In some examples, the threat detector 130 uses the packet analyzer 134 to apply one or more security models to detect threats. Examples include anomaly detection models, malware detection models, frequency of occurrence models, message pattern models, machine learning models, and/or other security models. For example, the threat detector 130 may use machine learning techniques in order to detect one or more security events including message patterns, message frequency and traffic that are usually encountered over one or more particular communication channels. In some embodiments, on egress, the threat detector may be used to implement a Virtual Local Area Network (VLAN) filter. VLANs may be used in the vehicle 1200 to separate out the internal networks. If there is compromised software in one Guest OS 212, this may be used to prevent the Guest OS 212 from communication with a VLAN it should normally not communicate with. This may reduce the ability of a malicious part to use components to attack other components of the operating environment 100.

For example, and without limitation, the machine learning model(s) described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The output(s) of the machine learning model(s) may include a threat detection decision value (e.g., a confidence value or binary value on whether a threat is detected), a security event type or class, representative of or used to derive security description values of the CDR, and/or other output types. The input(s) of the machine learning model(s) may include one or more network communications (e.g., a current message being transmitted received, a sequence of messages, messages of one or more particular types, etc.) and/or data derived therefrom, examples of which are described herein with respect to a Content Data Record (CDR) and the logger 142, which are examples of sources of the information (e.g., the security description). The machine learning models may in some examples be trained using data from the connection channel and/or connection channel type on which it is deployed. For example, anomaly detection over a connection may be based on historical data packets over that connection to capture what is typical traffic for that connection, or the historical data packets may be for all connections that leave the virtualized environment 102 and/or those between the guest OSes 212.

As some non-limiting examples, the threat detector 130 may perform anomaly detection by packet inspection with a Neural Network based detector (e.g., for IP-based communications). For anti-Malware, the threat detector 130 may also perform malware detection by packet inspection with Neural Network based detector (e.g., for IP-based communications). The threat detector 130 may be used to enforce cryptographic policies according to threat profiles. For example, if an entity tries to open an unauthenticated connection to a server the threat detector 130 may detect this security event and the threat manager 132 may block the connection so that only authenticated connections may be permitted. As a further example, the threat detector 130 may determine whether traffic is encrypted when it is supposed to be. The threat detector 130 may ensure that a packet is encrypted using an authorized cryptographic policy. For example, on an internal CAN bus, the threat detector 130 may be used to enforce that for CAN, all messages have to use SecOC. If the threat detector 130 detects that a packet does not have a cryptographic tag attached to it or cryptographic tag does not verify, a security event may be detected and remedial action performed.

To respond to detected threats, the threat manager 132 may use the notifier 138, the mode selector 140, the logger 142, and/or the filter 144. The notifier 138 may be configured to notify services in the operating environment 100 of detected threats. The services may be on any combination of the guest devices 120, the IDPS 122, the network switch 112, the TCU 110, the ECUs 108, or the client devices 104A, 104B, 104C. The logger 142 may be configured to log detected threats (e.g., using Common Criteria principles), and/or other data related to the communications. The filter 144 may be configured to filter one or more of the communications based on the detected threats.

The IDPS 122 may monitor communications over the communication channel(s) 150 and/or the communication channel(s) 152 on egress from the guest devices 120 and/or on ingress to the guest devices 120. Further, where multiple guest devices are employed, the IDPS 122 may monitor communications over the communication channel(s) 150 and/or the communication channel(s) 152 between different ones of the guest devices 120. Thus, IDPS 122 may act to protect the operating environment 100 as a whole, including the components and interconnections thereof.

The IDPS 122 may also be responsible for verifying the run-time integrity of Guest OSes running on the guest devices 120 and for centralized secure collection and secure storage of security events logs for audit purposes (e.g., provided by the logger 142). The IDPS 122 may be responsible for maintaining its own backup so to restore a secure and safe image in case of failure. Further, the IDPS 122 may be configured to connect to a remote server for audit, as well as for updates and maintenance purposes (e.g., over the communication channels 150).

Figure 2A:
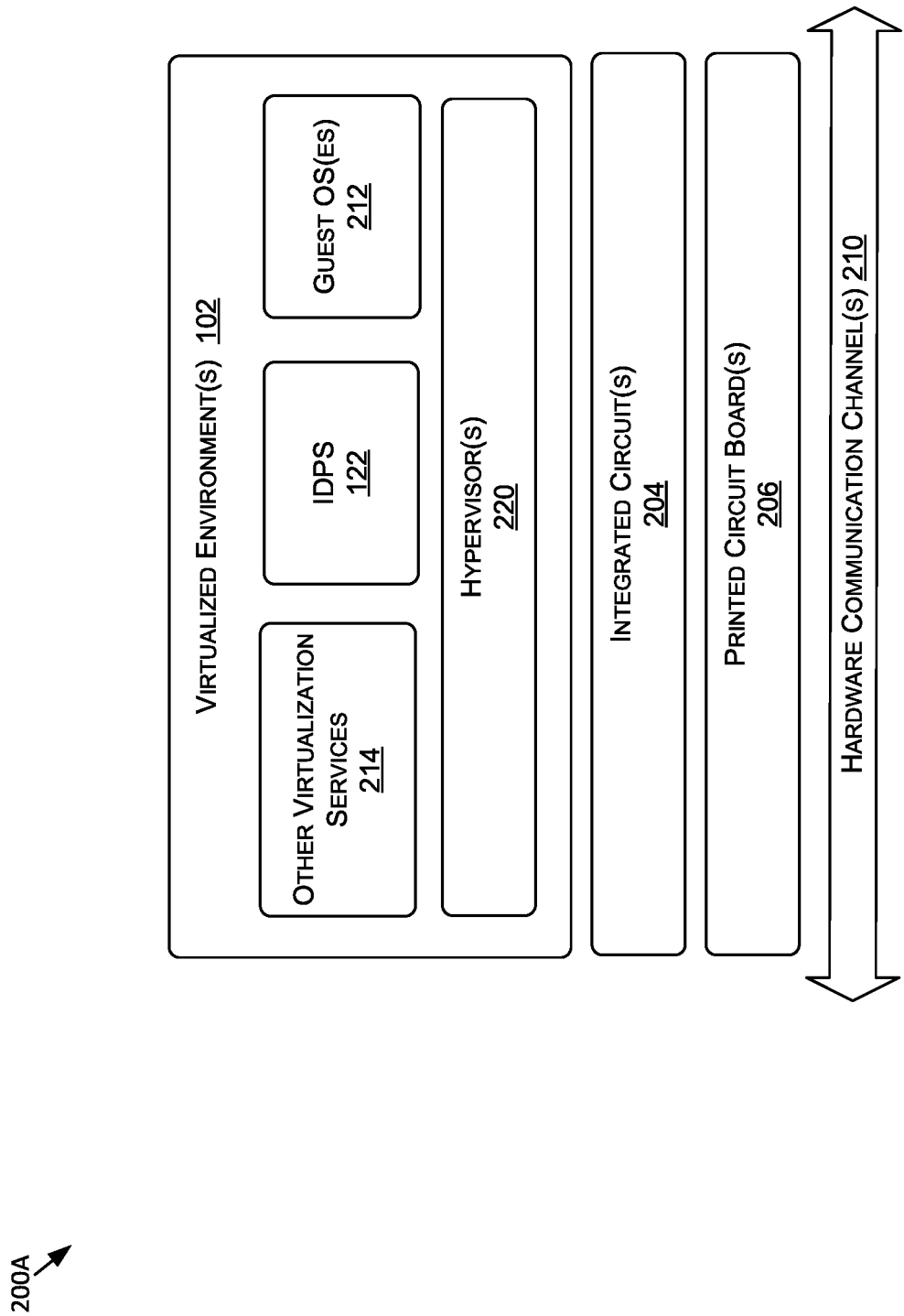
FIG. 2A is a block view of an example layered architecture that may be used to implement an IDPS, in accordance with some embodiments of the present disclosure.

Referring now to FIG. 2A, FIG. 2A is a block view of an example layered architecture 200A that may be used to implement the IDPS 122, in accordance with some embodiments of the present disclosure. The layered architecture 200A includes the virtualized environment(s) 102, one or more integrated circuits (ICs) 204, one or more printed circuit boards (PCBs) 206, and one or more hardware communication channels 210. As an example, a single virtualized environment 102, a single IC 204, and a single PCB may be used to implement the IDPS 122. For example, the virtualized environment 102 may be on such an embedded system that may include, but is not limited to, a System-on-a-Chip (SoC). In embodiments, the IDPS 122 may be implemented on one or more SoCs 1204 (FIG. 12C) and/or GPU(s).

The IC 204 may be separate from the network switch 112, the TCU 110, the client devices 104A, 104, and 104C, the sensors 106, the ECUs 108, and/or other physical devices outside of the virtualized environment 102. In other examples, one or more portions of the virtualized environment(s) 102 may be at least partially integrated in or distributed across any combination of those devices. For example, the IDPS 122 may be integrated into a TCU 110 in some embodiments.

The hardware communication channel(s) 210 may refer to physical portions of the communication channel(s) 150 and/or communication channel(s) 152 that are external to the embedded system and/or the virtualized environment 102 (e.g., an external Ethernet link and an external vehicle bus).

As shown, the virtualized environment(s) 102 may be managed by one or more hypervisors 220. The hypervisor 220 may run the IDPS 122, one or more guest OSes 212, and other virtualization services 214. Examples of the guest OSes include deployments of Linux, Android, GENIVI, QNX, etc. Each guest OS 212 may correspond to a respective one of the guest devices 120 of FIG. 1. As a specific example, one of the guest OSes 212 IVI, another to clusters, another to HUDs, and yet another to ADAS and/or autonomous driving. Functionalities that do not require access to a vehicle bus may be separated out from other functionalities to further protect the operating environment 100. For example, functionalities that do not require access to the vehicle bus may be implemented on guest OSes that do not include a connection to the communication channel 152 (although information corresponding to sensor readings and the like may be received from a guest OS that does). Examples of the other virtualization services 214 include storage virtualization, Universal Serial Bus (USB) virtualization, etc. The hypervisor 220 may support the virtualized components with isolated execution environments on partitions of the virtualized environment 102. Each partition may correspond to a virtual machine and have a dedicated virtual address space. By implementing components on different partitions, if a component is breached, components on different partitions may still be protected. For example, because of the isolated execution environments, a breached component may not be used to execute malicious code on a component on a different partition.

In some embodiments, each guest OS 212 may be on a different partition of the partitions supported by the hypervisor 220. The IDPS 122 may be implemented on one or more partitions that are different than the partitions used for the guest OSes 212. Thus, if a guest OS 212 is breached, the IDPS 122 may still act to protect the operating environment 100. The other virtualization services 214 may be on one or more partitions that are different than the IDPS 122 and the guest OSes 212 or may be integrated into those components. These are some examples of how the IDPS 122, the guest OSes 212, and the other virtualization services may be distributed across partitions supported by the hypervisor 220 and other examples are described herein. According to some embodiments, the IDPS 122 may be implemented as a Virtualized Security Appliance positioned above the guest OSes 212 in the chain of trust of the certificate chain of the virtualized environment 102, such as right after the Hypervisor 220. Using this approach may further protect the operational environment from breaches of the potential more vulnerable guest OSes 212.

Figure 2B:
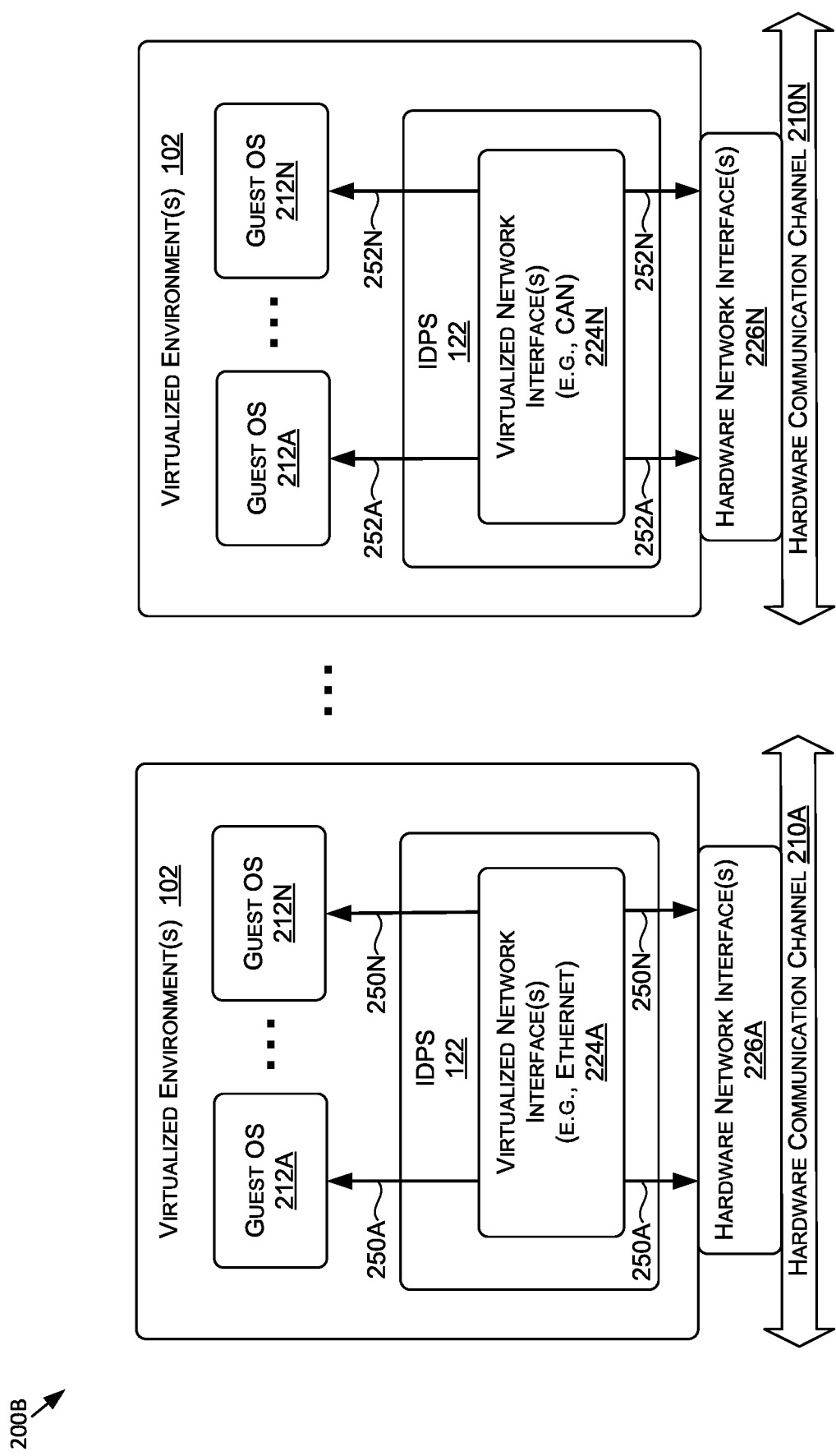
FIG. 2B is a block view of example layered architectures that may be used to implement an IDPS with a focus on network interface virtualization, in accordance with some embodiments of the present disclosure.

Referring now to FIG. 2B, FIG. 2B is a block view of example layered architectures 200B that may be used to implement the IDPS 122 with a focus on network interface virtualization, in accordance with some embodiments of the present disclosure. As indicated in FIG. 2B, the IDPS may in some embodiments support any number virtualized network interfaces (e.g., of the interface manager 146 of FIG. 1) which may allow the guest OSes 212 to share a hardware network interface. For example, FIG. 2B shows a guest OS 212A and a guest OS 212N, which may be included in the Guest OSes 212 of FIG. 2A. The guest OSes 212A and 212N may include a virtualized network interface 224A to a hardware network interface 226A, which may be IP network interfaces, such as Ethernet interfaces. The hardware network interface 226A provides access to a hardware communication channel 210A, which may correspond to physical portions of the communication channel(s) 150 that are external to the embedded system and/or the virtualized environment 102 (e.g., an external Ethernet link). Similarly, the guest OS 212A and the guest OS 212N may include a virtualized network interface 224N to a hardware network interface 226N, which may be vehicle bus network interfaces, such as CAN interfaces. The hardware network interface 226N provides access to a hardware communication channel 210N, which may correspond to physical portions of the communication channel(s) 152 that are external to the embedded system and/or the virtualized environment 102 (e.g., an external CAN bus).

Each virtualized network interface may include any combination of drivers, virtual network devices, virtual network components, virtual network cards, and/or virtual network links or connections, which may be particular to the type of network being virtualized. Examples include virtual routers, switches, controllers, transceivers, bridges, ports, wires, links, busses, etc.

By virtualizing network interfaces, any number of guest OSes may communicate with one another over the network, as if they were separate end-points on the network. Additionally or alternatively, the guest OSes may share the same physical hardware, such as a physical port to the hardware communication channel. For example, the guest OS 212A is shown as including one or more communication channels 250A and the guest OS 212A is shown as including one or more communication channels 250N, which may correspond to virtualized portions of the communication channels 150 of FIG. 1 that are dedicated to the respective guest OSes. The guest OS 212A and the guest OS 212N may communicate over the communication channels 250A and 250N or with external devices using the communication channel(s) 250A and the communication channel(s) 250N respectively. Similarly, the guest OS 212A is shown as including one or more communication channels 252A and the guest OS 212A is shown as including one or more communication channels 252N, which may correspond to virtualized portions of the communication channels 152 of FIG. 1 that are dedicated to the respective guest OSes. The guest OS 212A and the guest OS 212N may communicate over the communication channels 252A and 252N or with external devices using the communication channel(s) 252A and the communication channel(s) 252N respectively.

Virtualizing the network interfaces may provide for the Guest OSes 212 not being aware of one or more components of the IDPS 122. This may be accomplished by using virtualized drivers that look like normal hardware drivers to the higher layers of the Guest OSes. Moreover, multiple guest OSes may access the same single peripheral without knowledge of each other. In embodiments without virtualization of drivers, the hardware drivers in the Guest OSes may communicate directly to the hardware devices and other peripherals. In embodiment with virtualization, the drivers of the guest OS may not communicate to the hardware directly, but to virtual hardware, which sits in the virtualization domain (managed by the hypervisor 220), and which in turn communicates to the physical hardware. This result in an abstraction level between OS drivers and actual hardware.

In some embodiments, the virtual drivers may be paravirtualized drivers that the guest OSes use to communicate with the outside world and other guest OSes. Paravirtualization may introduce an additional layer of abstraction (virtualization). The Guest OS drivers may directly communicate to what they think is the hardware, but the communications may be intercepted by the IDPS 122. The IDPS 122 may in turn use the virtualized network interfaces 224A to interface with the hardware.

The virtualized network interfaces may further provide for paravirtualization of peripherals to create a Virtual Local Network (VLN) for interconnection between the Guest OSes and between the Guest OSes and peripherals. Paravirtualization of peripherals may allow each of the interfaces to be isolated, limiting attacks from penetrating to other subsystems and affecting larger portions of the virtualized environment 102.

Referring now to FIG. 2C, FIG. 2C is a block view of an example layered architecture 200C that may be used to implement the IDPS 122 with a focus on a security manager 232 and a communications manager 234 of the IDPS 122, in accordance with some embodiments of the present disclosure. The IDPS 122 may include the security manager 232 and/or the communications manager 234. The communications manager 234 may include the virtualized network interfaces of the IDPS 122, such as the virtualized network interface 224A and the virtualized network interface 224N of FIG. 2B. Further, the security manager 232 may sit between the guest OSes and the communications manager 234 on the communication channels 250A, 250N, 252A, and/or 252N.

The communications manager 234 may be responsible for managing communications between hardware peripherals, and the security manager 232 may be responsible for monitoring the communications for potential threats and to enact the appropriate policy once a threat is detected.

The communications manager 234 may be implemented as a VM running (for example) an embedded, secure operating system. The communications that may be managed include communications between SoCs and/or between subsystems of the same SoC. The communications manager 234 may be able to submit and receive fully formed frames (formed by upper layers)—such as Ethernet and/or CAN frames—to the network (e.g., Ethernet or CAN) infrastructure in the vehicle 1200 used by the embedded system. The communications manager 234 may also enforce bandwidth and latency guarantees needed by upper level protocols at the VMs (e.g., Guest OSes), with each VM being responsible for submitting frames from a virtualized driver.

The communications manager 234 may provide network perimeter security features, such as (without limitation): distributed denial-of-service (DDoS) resistance, traffic filtering, stateless firewall, and restricted cone connection management. The Communications manager can also be implemented with infrastructure programming features, for example and without limitation: switch configuration, traffic shaping, traffic class arbiter programming, and Virtual Local Area Network (VLAN) filtering.

The security manager 232 may inspect all traffic between the communications manager 234 and the Guest OSes 212. To do so, the security manager 232 may include one or more instances of the threat detector 130, the threat manager 132, the packet analyzer 134, the cryptography engine 136, the notifier 138, the mode selector 140, the logger 1342, and the filter 144. A configuration file may be used to configure the detection and policies for the traffic. Once an attack is detected by the threat detector 130, the security manager 232 may be responsible for enacting the configured policy for that attack using the threat manager 132. This may be used, for example, to implement one or more stateful firewalls.

Figure 3:
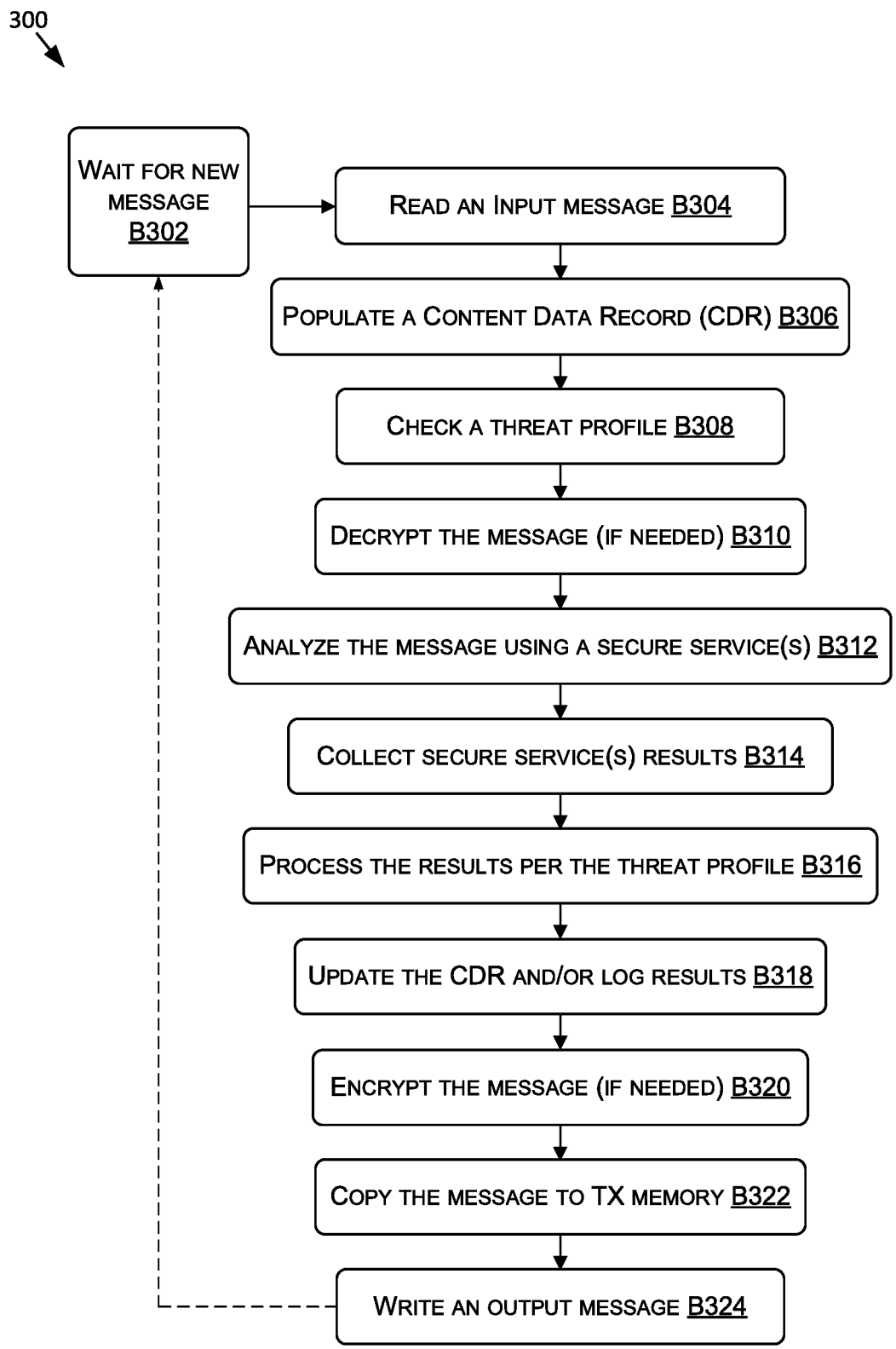
FIG. 3 is a flow diagram showing a method an IDPS may use to process network communications for security threats, in accordance with some embodiments of the present disclosure.

The security manager 232 may include, for example, a security Application Programming Interface (API) 240, a driver API 242, and/or a communications processor 244. The security API 240 may provide an interface to security tools and services. The driver API 242 may provide an interface to drivers of the virtualized network interface(s) 224A and/or 224N which may be included in the communications manager 234. Further, the communications processor 244 may manage the processing of communications as they are received and transmitted by the security manager 232, such as by an instance of the threat detector 130. To manage the processing of the communications, the communications processor 244 may use a state machine. The security manager 232 may be implemented using a number of threads. Each thread may be responsible for processing one communications at a time. The security manager 232 may run multiple threads simultaneously and may receive a notification message of a new communication via a FIFO buffer. The notification message may include a header and a pointer to the payload data of the communication. Once the notification message has been collected from the FIFO buffer, the next thread may then be able to poll the FIFO buffer for a notification message. Which thread gets to access the FIFO buffer may be controlled by a MUTual EXclusion object (MUTEX) implementation to prevent multiple threads from accessing the same data. FIG. 3 is used to describe an example of communications processing an instance of the security manager 232 may perform (e.g., in either direction).

Like the communications manager 234, the security manager 232 may be implemented as a VM executing a secure, embedded system-specific operating system. In some embodiments the communications manager 234 and the security manager 232 are on separate VMs on separate partitions supported by the hypervisor 220. Thus, if the communications manager 234 becomes compromised, such as via a network stack of the virtualized network interfaces 224A, the security manager 232 may remain uncompromised to secure the operating environment 100. In other embodiments, the security manager 232 and/or the communications manager 234 may share a VM and/or partition. As further examples, the security manager 232 or the communications manager 234 could be incorporated into one or more of the guest OSes 212 and/or share a partition with a guest OS 212. For example, functionality of the security manager 232 may be included in one or more of the guest OSes 212 rather than the IDPS 122.

The security manager 232 and/or the communications manager 234 may be used to support multiple network protocols, such as Ethernet and CAN, or multiple implementation of the security manager 232 and/or the communications manager 234 may be provided that are dedicated to one or more particular network protocols. For example, one implementation of the communications manager 234 may include the virtualized network interface 224A and another may support the virtualized network interface 224N. Thus, where multiple implementations are used for a component, each component may be customized to the supported network protocol(s) and/or other requirements such as traffic characteristics. Also where multiple implementations are used, each may be on a separate partition and/or VM, or one or more may share a partition with another implementation and/or virtual component described herein.

Approaches described herein may provide for separation of domains (Security and Communications), as well as flexibility and testability. For example, in accordance with disclosed embodiments, the security manager 232 may be completely removed from the virtualized environment 102, without having to modify the communications manager 234. Also, in some embodiments, the security manager 232 may be provided without the communications manager 234 (e.g., virtualized network interfaces and/or drivers may be used). Additionally, while the guest OSes 212 have been described as being within the virtualized environment 102, one or more of the guest OSes 212 may be implemented as a separate devices, and may not necessarily be a VM. Thus, for example, one or more of the guest devices 120 of FIG. 1 may be outside of the virtualized environment 102.

A typical automotive platform such as the Drive AV software stack developed by NVIDIA Corporation may be used to supports one or more of the Guest OSes 212 using the hypervisor 220. Such a platform also provides a range of virtualized services for common functions. The security manager 232 and the communications manager 234 and may be two collections of these services.

Figure 2D:
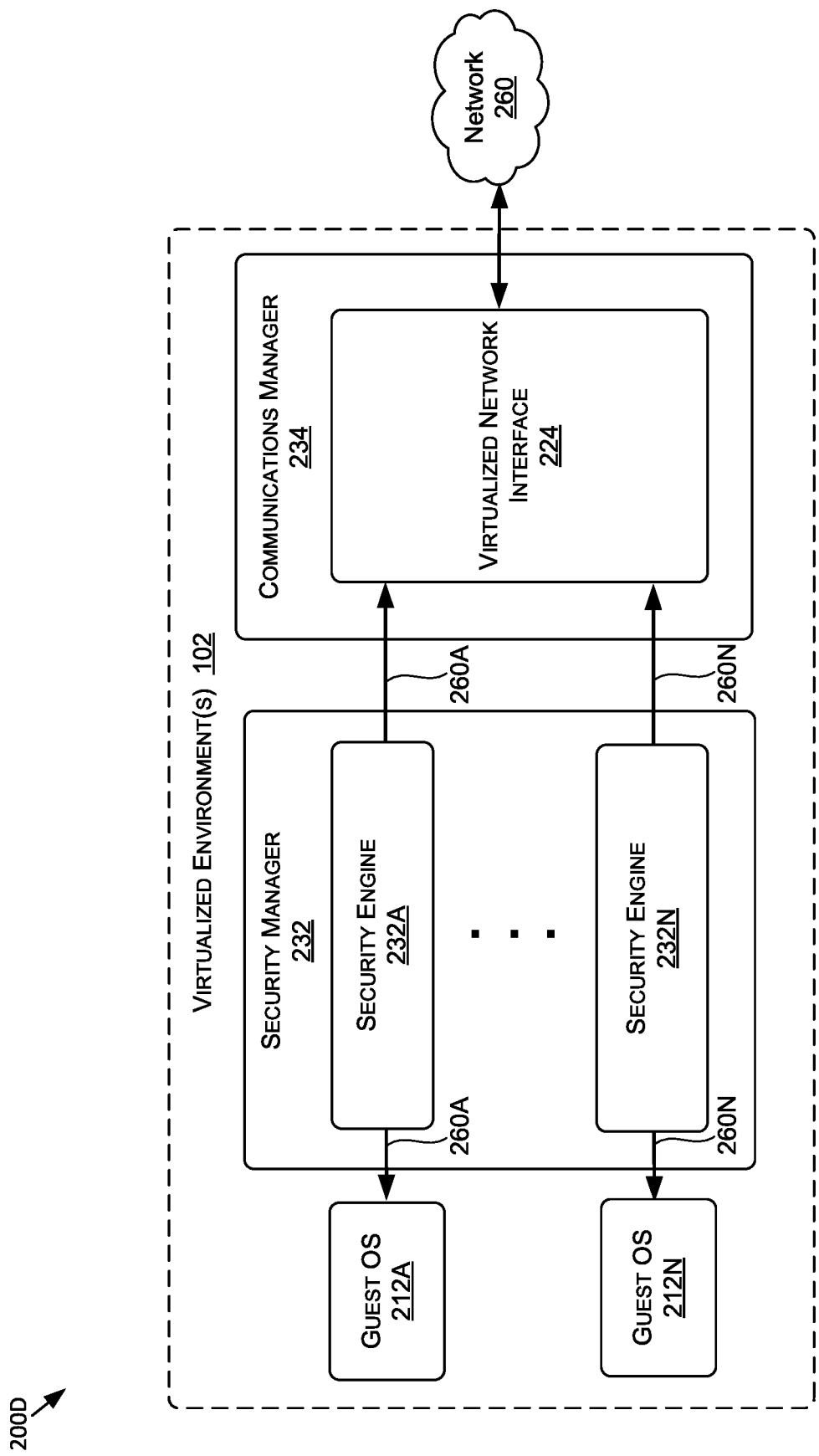
FIG. 2D is a diagram illustrating security engines, which may be used to implement an IDPS, in accordance with some embodiments of the present disclosure.

Referring now to FIG. 2D, FIG. 2D is a diagram illustrating security engines, which may be used to implement the IDPS 122, in accordance with some embodiments of the present disclosure. FIG. 2D shows that multiple instances of a security engine may be used to implement communication channels to a network 260. In the example shown, a communication channel 260A and 260N may correspond to the communication channel 250A and 250N respectively, with the network 260 being provided via the hardware communication channel 210A, or the communication channel 260A and 260N may correspond to the communication channel 252A and 252N respectively, with the network 260 being provided via the hardware communication channel 210N.

As shown, each communication channel for a guest OS may include a dedicated instance of a security engine, with a security engine 232A being provided for the guest OS 212A and a security engine 232N being provided for the guest OS 212A. Each security engine 232A through 232N for a communication channel may, for example, include the security API, the driver API, and the communications processor 244. Further, each security engine 232A through 232N for a communications interface type and/or channel may, for example, have a threat profile (e.g., individual and independent), having detection settings on how the threat detector 130 detects threats (e.g., by threat type) and/or response settings on how the threat manager 132 responds to detected threats (e.g., by threat type) using the security engine. The detection setting may specify or define which security models to apply. As indicated above, this information may at least partially be defined in configuration files. For example, the configuration files may be user defined configuration files. A user with respect to the virtualized environment 102 may refer to a user that configured or provided a corresponding guest OS for deployment in an operational environment and/or an Original Equipment Manufacturer (OEM) of the vehicle 1200. Using configuration files, the guest OS 212A and the guest OS 212N may have different threat profiles for the same physical interface and/or for different logical channels over the same physical interface.

The configuration file(s) may be encrypted and signed at "factory/production time," then written to the embedded system for deployment of the IDPS 122. The IDPS 122 may use the cryptography engine 136 to decrypt and read the configuration file(s) as part of the boot process to self-configure networking parameters and security policies (e.g., detection settings and response settings) for run-time. The configuration file may be updated while the IDPS 122 is deployed in the vehicle 1200, such as by pushing over-the-air (e.g., via the external network 114) a new file to the embedded system to replace the current one. As a result, the IDPS 122 may update its configuration according to the new configuration file.

A threat profile may define parameters for various classes of threats. When the threat detector 130 detects a hard policy threat, the threat manager 132 may use the filter 144 to block the threat by default. The threat policy may also be configured to allow specific cases not to be blocked for a hard policy threat. For example, all incoming traffic may be blocked unless the source of that traffic was already communicated by a guest OS (and detected by the security engine), thus effectively acting as an incoming packet filter for unsolicited traffic. However, for IP-based traffic it is possible in embodiments to configure a specific IP port address to always be open in the configuration file.

For threats of a normal threat detection class, a user may configure different policies depending on a type of threat detected. Examples of these policies may include, for example: 'no action, let through.'

A temporary threat detection class, may include detected attacks that happen for a period of time, such as DoS attacks. To this effect, the threat detector 130 may be configured to determine or detect whether a particular attack is ongoing and the threat manager 132 may act or refrain from acting based on that determination in accordance with the threat profile.

In any example, the threat manager 132 may take one or more remedial actions based on threats detected by the threat detector 130. Any number of remedial actions may be defined for and/or taken for each detected attack and/or a combination of detected attacks. The remedial actions to be taken may be defined in a threat profile for particular threat classes and/or types. One example of a remedial action is to allow a communication that is detected to correspond to a threat. Another example is to block, or filter out the communication. In this case, the threat manager 132 may use the filter 144 to filter the communication. A further example includes logging an event, such as the detection of the communication and/or of an attack that happens for a period of time (e.g., DoS). Here, the threat manager 132 may use the logger 142 to log the detected event, such as with metadata describing the event and/or one or more associated communications. Examples include a timestamp, communication contents, data field values, the source of the communication, the threat type, etc.

In some examples, a remedial action may include verifying the integrity of the Guest OS assigned to the communication channel and/or other components of the operating environment 100. For example, for a threat detected using the security engine 232A, the threat manager 132 may initiate an integrity check of the guest OS 212A and/or a source or other conduit of one or more communications from which the threat detector 130 detected the threat (or other network components such as the TCU 110 or network routing devices). For example, the integrity check may be performed on the network interface itself, such as a virtualized or para-virtualized driver, a virtualized network interface, the communications manager 234, etc. A remedial action may also include the threat manager 132 using the mode selector 140 to change or set an operational mode of any combination of the aforementioned components (e.g., guest OSes, interfaces, the virtualized environment 102 itself, etc.). Examples include resetting (or rebooting) the component, disabling the component, blocking the component from communicating (e.g., the particular communication channel), resetting the component, blacklisting one or more components by one or more other components, and/or initiating a preconfigured safe mode of the component(s). A further example or a remedial action includes notifying the component(s). For example, the threat manager 132 may notify any combination of the components, in which case the components may take any combination of the various remedial actions (e.g., they may be determined and/or implemented internally at the component level in contrast to at the level of the security manager 232). A notification message to a component may include any of the various information that the logger 142 may log and/or other information.

Implementations of the threat detector(s) 130 and/or the threat managers 132 may be used by the security manager 232 and the communications manager 234 to each implement one or more stateless and/or stateful firewalls as well as countermeasures (remedial actions) to DoS attacks. A DoS attack may refer to a cyber-attack where an offender machine(s) makes a target host or network resource unavailable to its intended users by temporary or indefinitely disrupting services (e.g., internet services). These attacks may not always be avoided but can be mitigated with firewall strategies tailed to minimize the service disruptions on the target host. The firewall(s) described herein may be used for detection and recovery from at least the most common DoS attacks. For example, each security manager may include a stateful firewall (e.g., block an illegal sequence of messages over an HTTP connection) and the communications manager 234 may include a stateless firewall (e.g., block communications to/or from an unauthorized port). Firewalls and DoS countermeasures of the IDPS 122 may be used to protect the boundaries of each Virtual Network. Using the firewalls, the IDPS 122 may be able to intercept all communications between the guest OSes 212A through 212N and between the guest OSes 212A through 212N and any other peripheral component in the vehicle 1200. The IDPS 122 may be thus equipped with visibility of all data being exchanged within the virtualized environment 102 (e.g., an embedded system) and between the virtualized environment 102 and the external world.

Now referring to FIG. 3, each block of a method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, using particular components. However, these methods may additionally or alternatively be executed by any one system, or any combination of systems, including, but not limited to, those described herein.

FIG. 3 is a flow diagram showing the method 300 the IDPS may use to process network communications for security threats, in accordance with some embodiments of the present disclosure. The method 300 may, for example, be performed by the communications processor 244 of FIG. 2C. The communications processor 244 may be implemented using any number of threads and each thread of the security engine 232A may perform the method 300 in parallel. The method 300, at block B302, includes waiting for a new message. For example, the thread may wait for the network communication from the FIFO buffer. This may correspond to an initialization state where each security service thread may wait for a new notification of a message. Each thread may then request a MUTEX of the FIFO buffer and access the new message. If the message retrieval is successful, the thread may then release the MUTEX and move to the block B304.

The method 300, at block B304, includes reading an input message. For example, the thread may read the network communication. This may involve checking the integrity of the incoming message and accessing the payload data that the new message is associated with.

The method 300, at block B306, includes populating the CDR. For example, the thread may populate a CDR for the network communication. This may include creating the CDR for the new message. The CDR may be kept and updated by the thread for as long as the message is being processed by the security services manager 232. The CDR may contain information that defines a security description of the message being inspected, e.g. (the following list is not exhaustive): a record type, a record identifier, a message identifier, a sequence identifier, a current state in a state machine (where the communications processor 244 handles messages using state machines), a data type, a message priority, a TSL/SSL message indicator, a timestamp, a message source, a message destination, a pointer to the message data payload, a size of the message data, an error field, and/or a policy scan result. It is noted that any combination of the information in the CDR may be logged by the logger 142 or used to derive logged information (e.g., as part of a remedial action). The packet analyzer 134 of FIG. 1 may analyze the message to generate one or more of the details in the CDR. For example, the packet analyzer 134 may extract at least some of the information from the message headers of the network communication.

The method 300, at block B308, includes checking a threat profile. For example, using the CDR, the threat detector 130 may match the data type to a threat profile. The Threat profile may decide what type of actions should be taken for the specific message type.

The method 300, at block B310, includes decrypting the message if needed. For example, the thread may use the cryptography engine 136 to decrypt the network communication if the network communication is encrypted (e.g., using a known key). As one example, a Secure Sockets Layer (SSL) proxy may be implemented to increase the level of messages that may be scanned by the thread, and by extension the overall security protection the security manager 232 may provide. The SSL proxy may allow the security manager 232 to act as a proxy between the user facing guest OS 212A and an SSL server during an SSL connection. This may allow the thread to run security scans on the data and then re-encrypt the data after it has been scanned.

The method 300, at block B312, includes analyzing the message using one or more secure services. For example, the thread may use the threat detector 130 to launch one or more secure services. Each secure service may launch one or more scan requests depending on the threat profile. Scan requests may also be run by the threat detector 130 in parallel using multiple threads of secure services. The scans may be performed using the security API 240 of FIG. 2C to call on APIs in security applications running on the security manager 232. Examples of the secure services include the anti-malware, anomaly detection, and firewall filtering. Once the secure services have been completed, the threat detector 130 may collect and merge the data back into the main thread at block B314.

The method 300, at block B316, includes processing the results per the threat profile. For example, the thread may use the threat detector 130 to process the results and determine whether the results correspond to a security event, and the threat manager 132 may use the threat profile to take one or more remedial actions based on the security event. As described herein, this may include whether the network communication should be allowed to continue or if other actions should be taken. These decisions may be based on the type of message that was processed and the associated threat profile.

The method 300, at block B318, includes updating the CDR and/or logging results. For example, the thread may append information to the CDR and/or log results of the security services and/or records of one or more remedial actions taken by the threat manager 132 or security events detected by the thread detector 130. The logs may include statistics and scan results. All of the data may be encrypted by the cryptography engine 136 to prevent un-authorized access.

The method 300, at block B320, includes encrypting the message if needed. For example, the thread may use the cryptography engine 136 to encrypt the network communication if the network communication is unencrypted (e.g., using a known key).

The method 300, at block B322, includes copying message data to transmit (TX) memory. For example, the thread may copy the network communication to transmit memory. This may allow the data to be copied to a location where it can be further accessed by other devices in the system for transmittal from the security engine 232A.

The method 300, at block B322, includes writing an output message. For example, the thread may write an output message to the FIFO buffer to tell the driver who should get access to the network communication and what information should be passed on along with the network communication.

Figure 4:
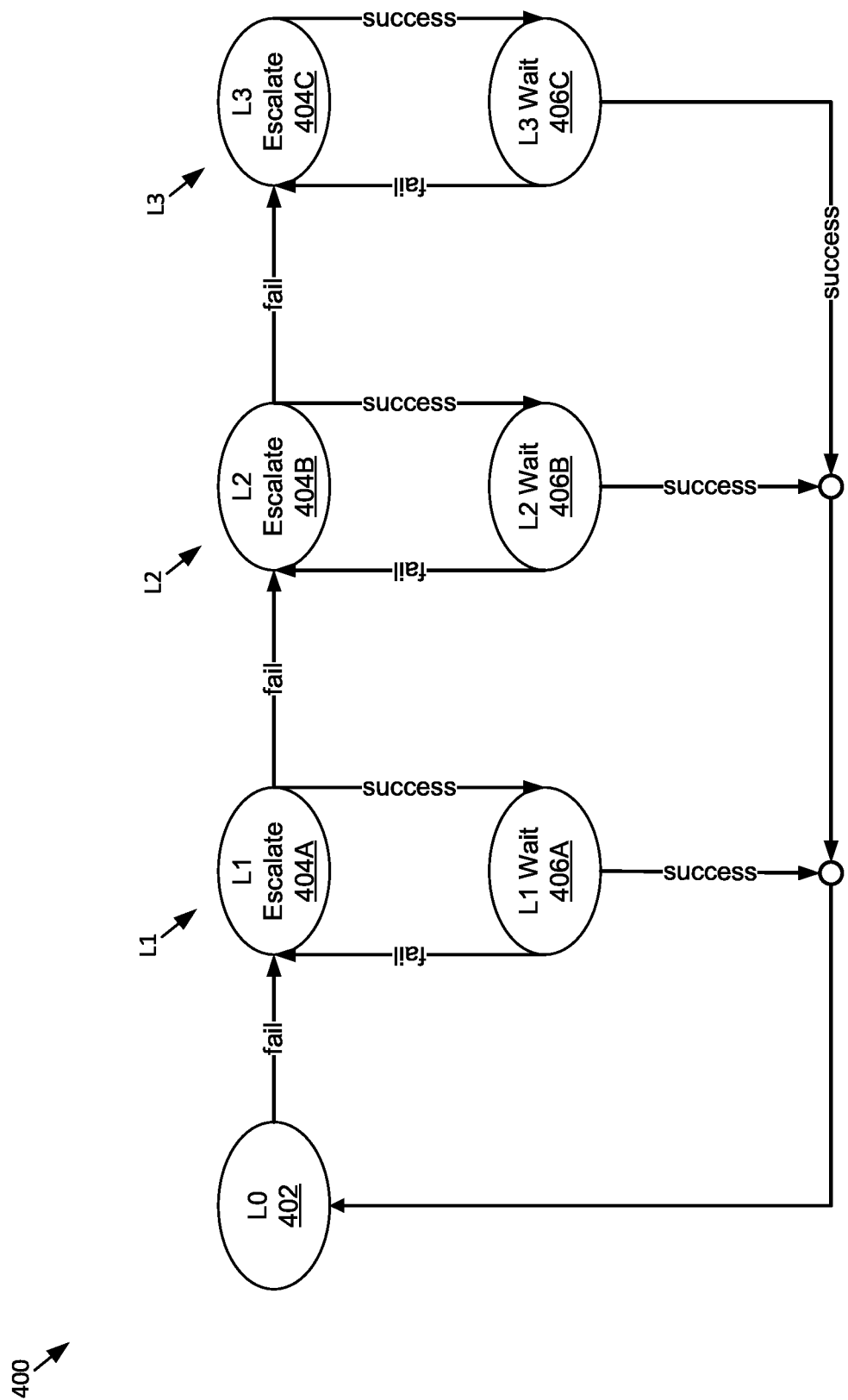
FIG. 4 is a diagram illustrating an example of a process of handling a cyber-attack that may occur over a period of time, in accordance with some embodiments of the present disclosure.

Referring now to FIG. 4, FIG. 4 is a diagram illustrating an example of a process 400 of the threat manager 132 handling a cyber-attack that may occur over a period of time, in accordance with some embodiments of the present disclosure. The process 400 may, for example, correspond to a temporary threat detection class, such as DoS attacks and similar cyber-attacks.

Cyber-attacks may originate internally, from a guest OS 212, or externally, such as via the TCU 110. The scale of a cyber-attack may depend on the type and frequency of the attack, which may lead to a system crash or to the unavailability of the system network services for a short or prolonged period. Countermeasures vary and, in the worst case, may involve the threat manager 132 performing the remedial action of a system reboot using the mode selector 140. The threat detector 130 may detect a cyber-attack based on measurements over a "Sense" period 402, which may be expressed as an integer number of a slot duration. The slot duration may refer to an internal parameter and define a duration for a measurement period (e.g., a minimum duration). The detection/determination of a cyber-attack may be performed at the end of the "Sense" period 402. Measurements and/or detected cyber-attacks may correspond to detected security events, and the process 400 may use the method 300 or other suitable method for this purpose. In case of a positive detection by the threat detector 130, an "Escalate" period 404A, 404B, or 404C may be started, and a recovery process (e.g., including one or more remedial actions) may be triggered for the type of attack using the threat manager 132.

As indicated in FIG. 4, a response to a cyber-attack (e.g., a DoS attack or other type of attack that occurs over a period of time) may be performed over multiple, escalation levels L1, L2, and L3. A three-level implementation is shown in FIG. 4, but any number of levels may be used. The escalation level L1 may be a low level, the escalation level L2 may be a medium level, and the escalation level L3 may be a high level. Each escalation level L1, L2, or L3 may involve different remedial actions applied over one or more periods. At the end of the "Escalate" period 404A, 404B, or 404C, the threat detector 130 may perform a check to assure the remedial actions for the current level have been successful. In case of failure, the threat detector 130 may raise the escalation level to the next level and further actions may be taken by the threat manager 132. In case of success, a "Wait" period 406A, 406B, or 406C may be started and the current remedial actions in place may be temporary removed by the threat manager 132 so the threat detector 130 may determine whether the system is still under attack. At the end of the "Wait" period 406A, 406B, or 406C, the escalation level L1, L2, or L3 may be de-escalated by the threat detector 130 if the threat detector 130 determines the system is safe, and otherwise the remedial actions may be reinstated using the threat manager 132.

Figure 5D:
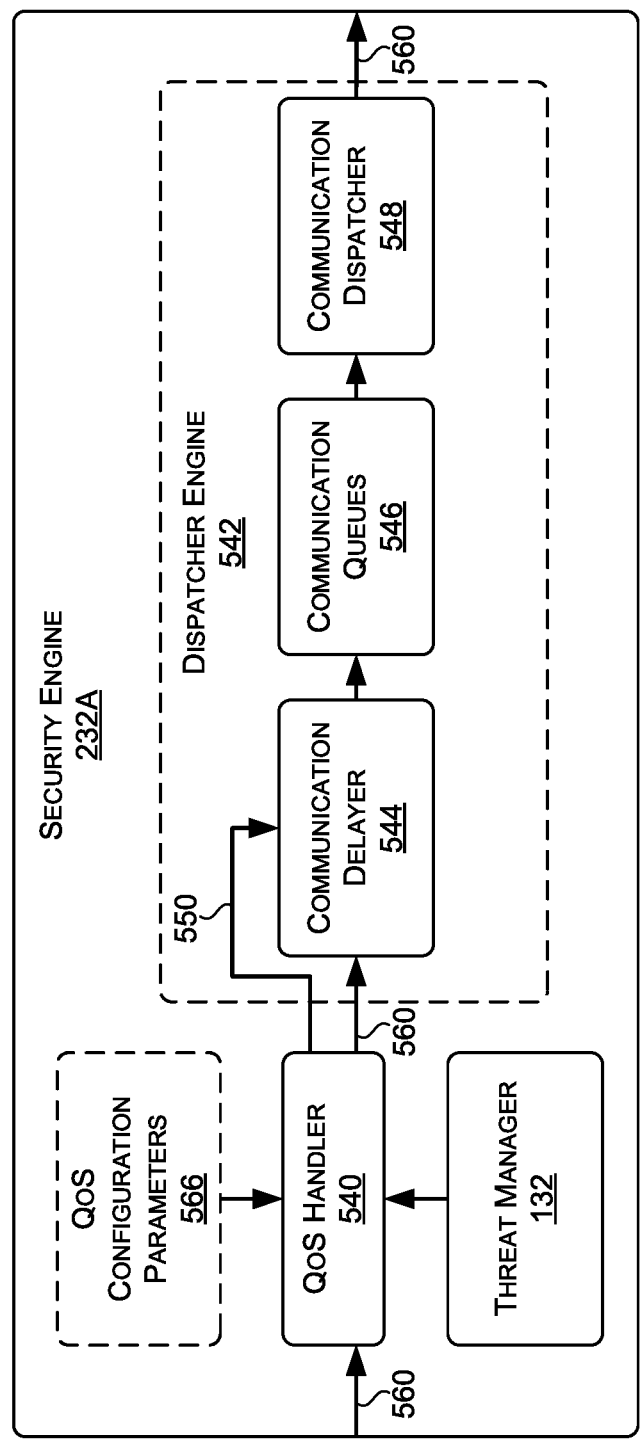
FIG. 5D is a diagram illustrating an example of a process of determining Quality of Service (QoS) parameters, in accordance with some embodiments of the present disclosure.
Figure 6:
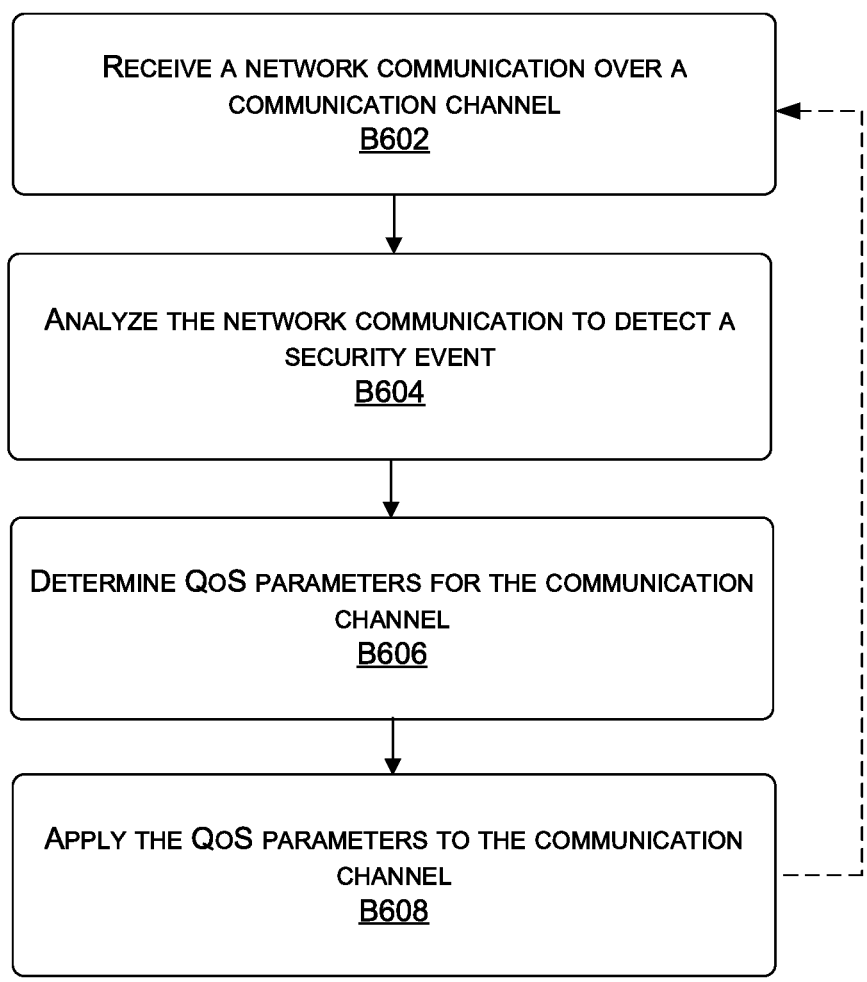
FIG. 6 is a flow diagram showing a method for adjusting network resources of communication channels, in accordance with some embodiments of the present disclosure.

Remedial actions for higher escalation levels (e.g., escalation level L3 or greater) may include the threat manager 132 requiring an action from a driver of the vehicle 1200 such as to stop the vehicle 1200 and/or power OFF or reboot the system. Further examples of remedial actions that may be used in the case of a cyber-attack and/or other detected security event is activating and/or modifying Quality of Service (QoS) on one or more of the communication channels 260A and/or 260N (e.g., to further limit network resources with an increased escalation level). The total bandwidth allocated for a connection-oriented and connectionless protocol may be artificially reduced to avoid any impact on other virtual communication channels. The QoS may be used to limit network resources available to the communication channel under attack once a DoS or other cyber-attack is detected, which may remove the risk of system resources being abused. The limit may be removed on attack de-escalation and the communication channel functionality may be restored back to normal. With this strategy any DoS flood attack may manifest itself as an increased latency of network activities targeted to the affected guest OS 212 without interruption of trusted connections. Meanwhile the full functionality of the other communication channels may be preserved. FIGS. 5D and 6 describe examples of approaches which may be used to implemented QoS-based remedial actions.

Examples of the IDPS for IP-Based Connections

FIGS. 5A-5D and 6 provide examples of aspects which may be incorporated into the IDPS 122 for IP-based connections. It is noted that not all of these aspects are required and that Ethernet-based IP connections are provided as a particular example, with other types of connections (IP-based or otherwise) being within the scope of the description whenever appropriate.

Figure 5A:
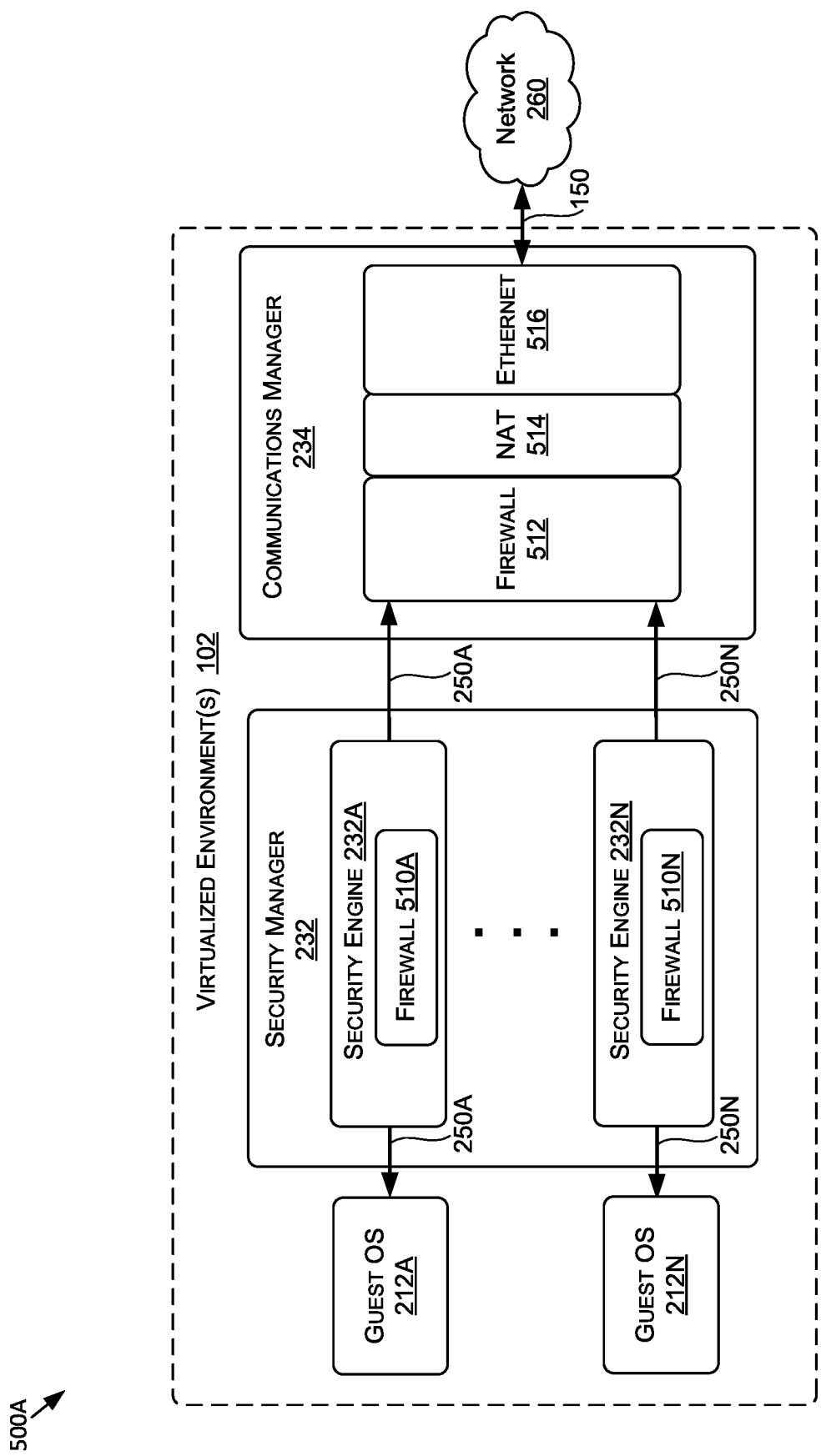
FIG. 5A is a diagram illustrating examples of networking components that may be used to implement an IDPS, in accordance with some embodiments of the present disclosure.

Referring now to FIG. 5A, FIG. 5A is a diagram 500A illustrating examples of networking components that may be used to implement the IDPS 122, in accordance with some embodiments of the present disclosure. As shown, each security engine may include a firewall. For example, the security engine 232A includes the firewall 510A and the security engine 232N includes the firewall 510N. Further, the communications manager 234 may include a firewall 512, a Network Address Translation (NAT) gateway 514, and an Ethernet interface 516 (e.g., a virtualized interface).

One or more implementations of the threat detector 130 and/or the threat manager 132 may correspond to the detection features of the firewalls 510A, 510N, or 512, and the NAT gateway 514, and those components may perform any of the various functionalities of the threat detector 130 and the threat manager 132 described herein. Further, one or more implementations of the threat manager 132 may correspond the response features of the firewalls 510A, 510N, or 512, and the NAT gateway 514. For example, where the security manager 232 and the communications manager 234 are in separate VMs, each VM may have one or more dedicated and/or customized threat detectors 130 and/or threat managers 132.

In this example, the communications manager 234 may be implemented as a VM, and may serve as the central gateway for all communication services, having ownership of the Ethernet interface driver of the Ethernet interface 516. The guest OSes 212A through 212N may share a single Ethernet interface via the NAT gateway 514. The NAT gateway 514 may define the boundaries between the internal and external network. A virtualized network interface may be assigned to each of the guest OSes 212A through 212N and communications with external networks may pass through the partitions comprising the security manager 232 and the communications manager 234.

According to some embodiments, Ethernet communications in the virtualized environment 102 may operate as a simulated multi-port enterprise class switch (e.g., in the Ethernet interface 516). Each guest OS 212A (e.g., VM) may be provided a port into the emulated switch environment, which is then connected to the physical Ethernet environment hosting the network 260. The Ethernet interface 516 may also enforce traffic bandwidth and latency guarantees as a physical Ethernet switch does. The combined security manager 232 and the communications manager 234 may operate on traffic at L1-L4 of the Open Systems Interconnection (OSI) networking model.

Figure 5B:
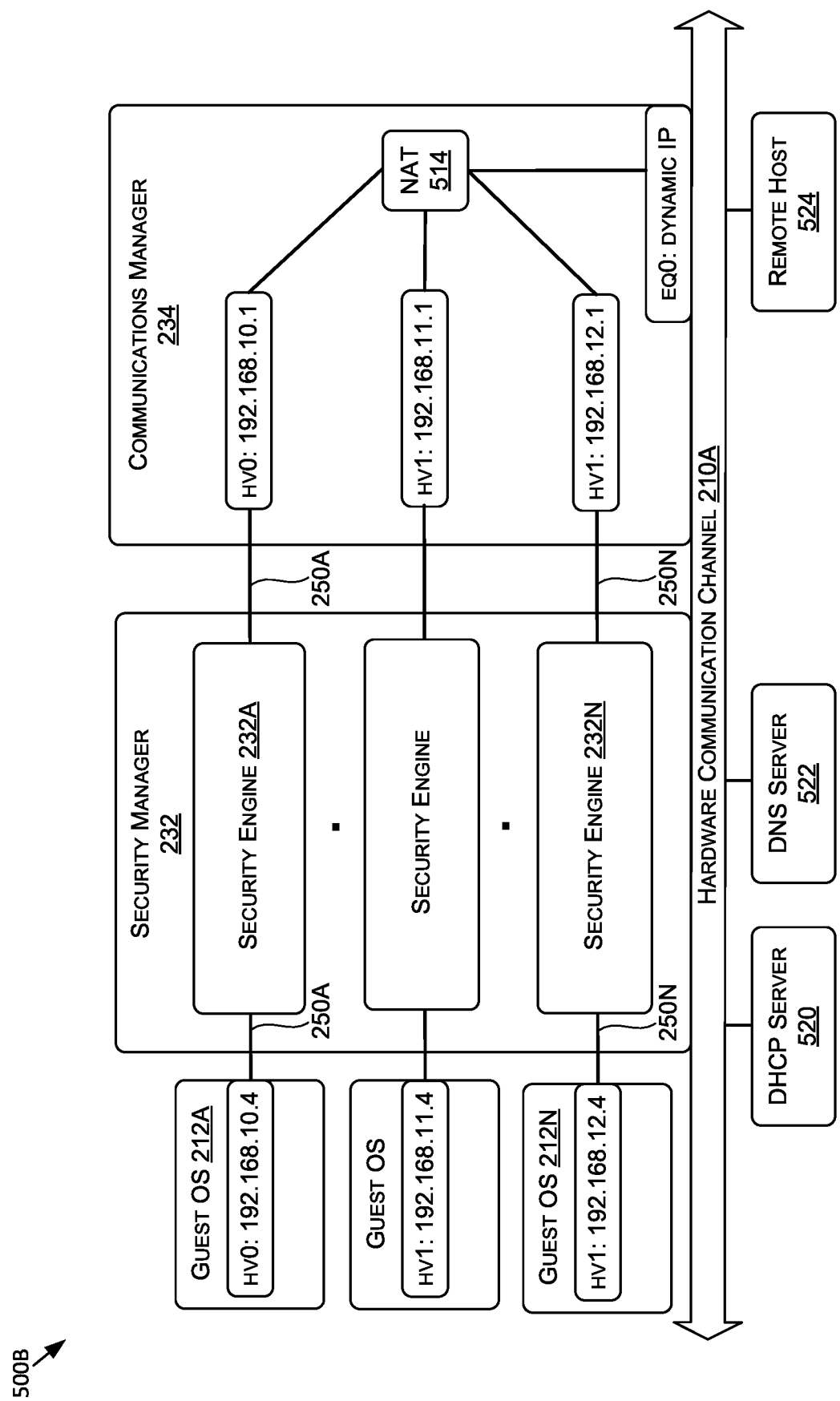
FIG. 5B is a diagram illustrating an example of a NAT gateway of an IDPS, in accordance with some embodiments of the present disclosure.

Referring now to FIG. 5B, FIG. 5B is a diagram 500B illustrating an example of the NAT gateway 514 of the IDPS 122, in accordance with some embodiments of the present disclosure. The diagram 500B includes a DHCP server 520, a DNS server 522, and a remote host 524. Each of the guest OSes 212A through 212N may be considered a node of an internal network with a pre-allocated private IP address. Access to the external network may be through the communications manager 234, which dynamically retrieves the IP address for the platform physical Ethernet interface (e.g., corresponding to the hardware network interface 226A of FIG. 2B) from the external DHCP server 520. The NAT gateway 514 may use a map function to translate network address information (e.g., an IP address and port number) between a private and a public domain and may allow nodes in the private network to share the platform physical Ethernet interface. The configuration presented in FIG. 5B may support more complex multi-OS network topology scenarios than what is shown.

The NAT gateway 514 may implement restricted cone connection management. For example, the NAT gateway 514 may be used by the communications manager 234 to apply a reverse cone NAT (which may also be referred to as a restricted Cone NAT) to the Ethernet interface 516. From the perspective of each of the guest OSes 212A through 212N, its communication channel may appear as a dedicated network connection with the NAT gateway 514 connecting to a dynamic IP address. The reverse cone NAT may only allow an inbound connection to a port to which an outbound connection has already been established. This prevents an inbound connection from an IP address to a guest OS behind the NAT gateway 514 unless the guest OS has first sent a packet to the IP address. Thus, the communications manager 234 may have additional security against inbound communications over the Ethernet interface 516.

Figure 5C:
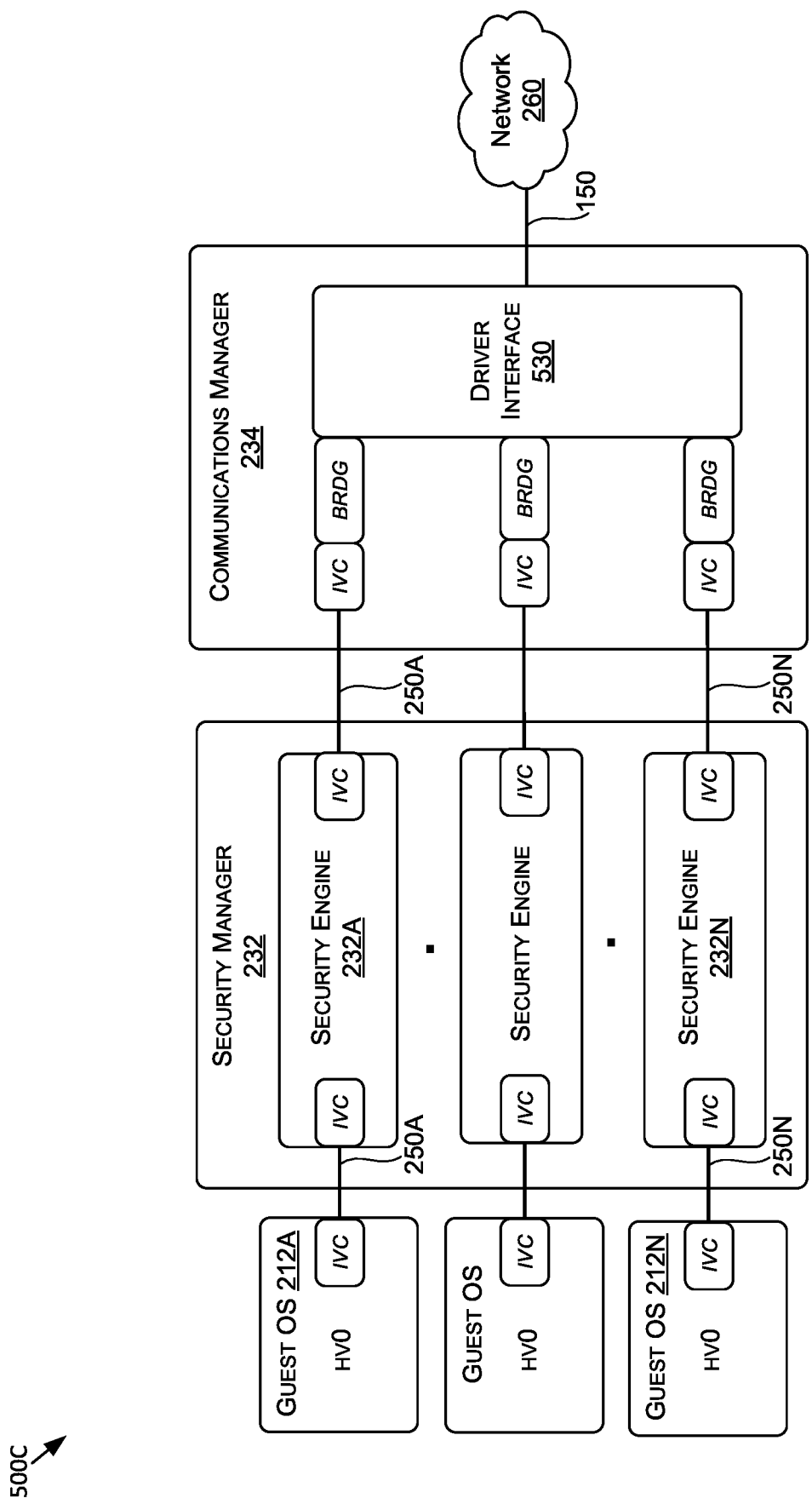
FIG. 5C is a diagram illustrating an example of components of a networking subsystem of an IDPS, in accordance with some embodiments of the present disclosure.

Referring now to FIG. 5C, FIG. 5C is a diagram 500C illustrating an example of components of a networking subsystem of the IDPS 122, in accordance with some embodiments of the present disclosure. The diagram 500C shows examples of virtual components connecting the guest OSes 212A through 212N to a driver interface 530. The virtual components for a connection may include multiple pairs of inter-VM communication buffers IVC, both inbound and outbound, as well as a bridge BRDG to the driver interface 530. The inter-VM communication buffers IVC may be scheduled by the hypervisor 220, allowing data to move across separate VMs.

The driver interface 530 may correspond to the virtualized network interface 224A of FIG. 2B and provide paravirtualized network interface drivers for the guest OSes 212A through 212N. As described herein, the paravirtualization may add an additional abstraction level to the virtualization, with the drivers of the guest OSes 212A through 212N communicating to what they think is the hardware, but the communications may be intercepted by the IDPS 122. The IDPS 122 may in turn use the driver interface 530 to interface with the hardware.

The driver interface 530 may comprise a para-virtualized driver and/or router the security manager 232 and/or the guest OSes 212 use to communicate with the outside world. The driver/router may be responsible for both notifying the security manager 232 that a new message is ready to be scanned and forwarding the message to the next partition once the scan has been completed. In the case a threat is detected during the scan by the threat detector 130, the message may be subject to one or more decisions applied using the threat manager 132 according to the threat profiles (e.g., in a configurable policy table).

The communications manager may, as non-limiting examples adhere to the following standards: 802.1AS initialization and path measurement, 802.1X authorization database, 802.1Q VLAN enforcement for inbound and outbound traffic, 802.1Q traffic classification enforcement, and/or 802.1AE enforcement at chip boundary and platform boundaries.

Referring now to FIG. 5D, FIG. 5D is a diagram 500D illustrating an example of a process of the security engine 232A determining Quality of Service (QoS) parameters, in accordance with some embodiments of the present disclosure. While the security engine 232A is shown, any of the various security engines herein may include similar components and be used in a similar process. The security engine 232A is shown with a QoS handler 540, an implementation of the threat manager 132, and a dispatcher engine 542. The dispatcher engine 542 includes a communication delayer 544, communication queues 546, and a communication dispatcher 548.

The QoS handler 540 may be used to allocate network resources to the communication channels 250A of the guest OS 212A. Examples of network resources may include traffic bandwidth and latency guarantees for particular communication channels (e.g., a channel to the guest OS 212N, a channel to the client device 104A, a channel to an external network 114, etc.). The QoS handler 540 may allocate the network resources according to QoS configuration parameters 566. The QoS configuration parameters 566 may define relative priorities the QoS handler 540 uses for the communication channels 250A. The QoS handler 540 may implement any suitable protocol for QoS, or may use a custom solution. As a non-limiting example, a priority may be defined using a Class of Service (CoS) of 802.1Q.

The QoS configuration parameters 566 may be defined by the configuration file for the guest OS 212A and/or security engine 232A described herein. For example, the QoS configuration parameters 566 may be provided by the threat manager 132 based on one or more security events being detected using the threat detector 130. Additionally or alternatively, the QoS configuration parameters 566 may have default settings which may be used when the threat detector 130 does not indicate an attack is occurring over the communication channels 250A. As a further example, the QoS handler 540 may normally be disabled, and activated by the threat manager 132 according to a threat profile. The QoS parameters may be configurable for each dedicated communication channel of a guest OS and/or IP protocol.

As an example, the QoS handler 540 may—for each network communication 560 that is received by the security engine 232A—compute an appropriate delay 550 based on the current QoS configuration parameters 566. The delay 550 may be delivered to a dispatcher thread of the dispatch 542 along with the network communication 560, as shown. The communication delayer 544 may use the delay 550 such that the communication queues 546 and the communication dispatcher 548 deliver network communications over the communication channels 250A in a correct time order.

Using this approach, the security manager 232 may limit network resources for one or more of the communication channels preserve network resources for other communication channels when the one or more communication channels are compromised. Further, by using a similar approach for each security engine, the guest OSes 212A through 212N may more effectively share a single hardware network interface 226A, even where some of the communication channels are under attack (e.g., a DoS attack).

Now referring to FIG. 6, FIG. 6 is a flow diagram showing a method 600 for adjusting network resources of communication channels, in accordance with some embodiments of the present disclosure. The method 600, at block B602, includes receiving a network communication over a communication channel. For example, the security engine 232A may receive the network communication 560 of FIG. 5D over a communication channel of the communication channels 250A.

The method 600, at block B604, includes analyzing the network communication to detect a security event. For example, the threat detector 130 may analyze the network communication 560 to detect a security event according to a threat profile. This may be performed in accordance with a process 500 of FIG. 5, by way of example.

The method 600, at block B606, includes determining QoS parameters for the communication channel. For example, based on the security event being detected and the threat profile, the threat manager 132 may activate the QoS handler 540 and provide the QoS configuration parameters 566 (e.g., defined by the threat profile) to the QoS handler 540.

The method 600, at block B608, includes applying the QoS parameters to the communication channel. For example, the QoS handler 540 may apply the QoS parameters to the communication channel, which may result in the delay 550 for the network communication 560 and/or one or more subsequent communications received over the communication channel.

In addition to or instead of the QoS handler 540, the communications manager 234 may act on the communication channels 150 as a whole, in contrast to the guest OS dedicated approach of the security engines. In some embodiments, the communications manager 234 may act to consolidate the QoS parameters used by the security engines 232A through 232N to QoS parameters of the network 260, so that the relative network resources of the communication channels 150 flow from the shared hardware network interface 226A to the external infrastructure of the operating environment 100. For example, the communications manager may assign a QoS tag to each outbound network communication based on the guest sending the network communication. The format of the QoS tag may be according to the protocol of the external infrastructure (e.g., the network switch(es) 112), such as using a Class of Service (CoS) of 802.1Q. Thus, the infrastructure may analyze the QoS tag and handle the network communication accordingly.

Examples of the IDPS for CAN-Based Connections

Figure 7:
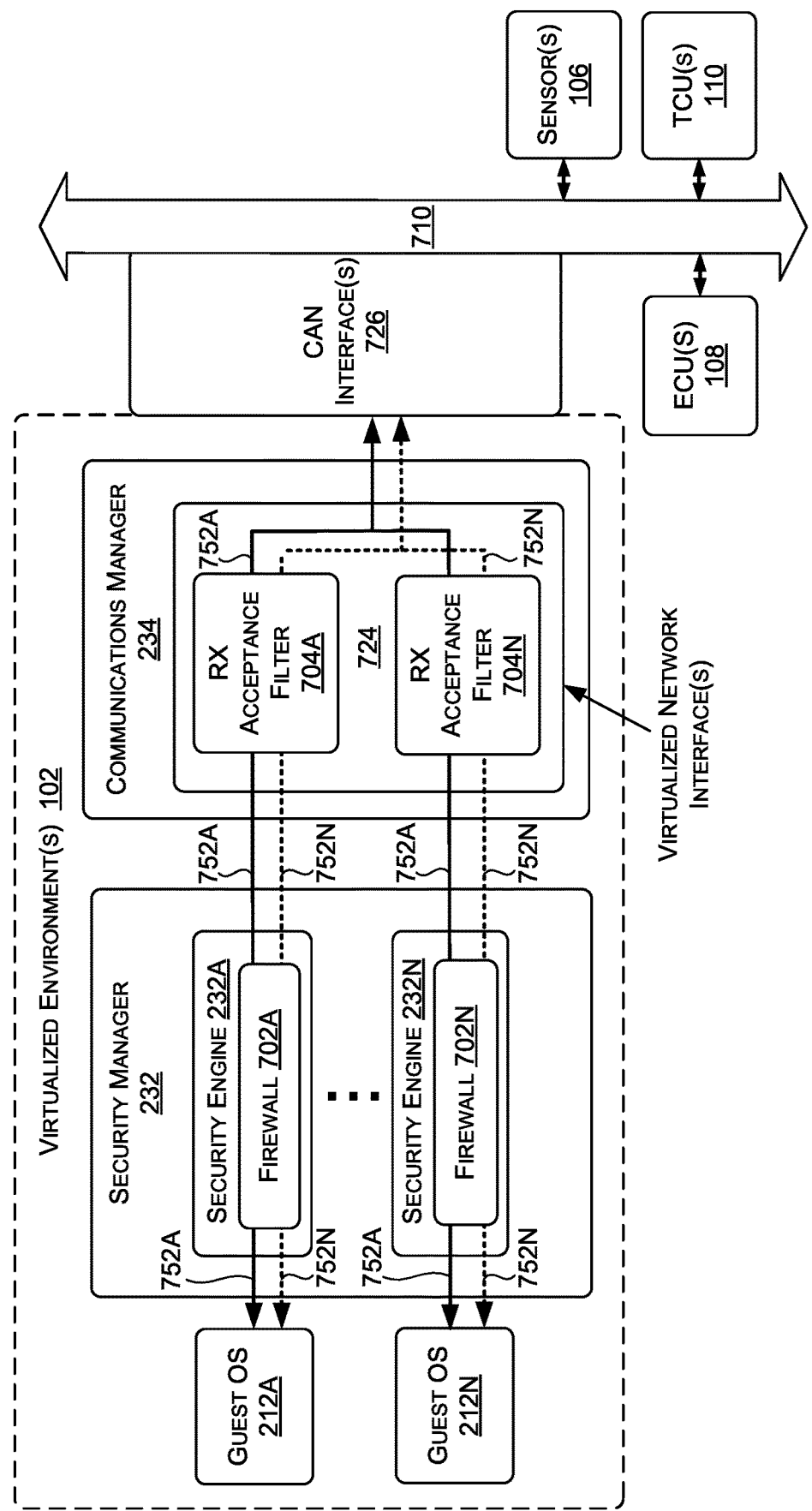
FIG. 7 is a diagram illustrating examples of networking components that may be used to implement an IDPS, in accordance with some embodiments of the present disclosure.
Figure 8:
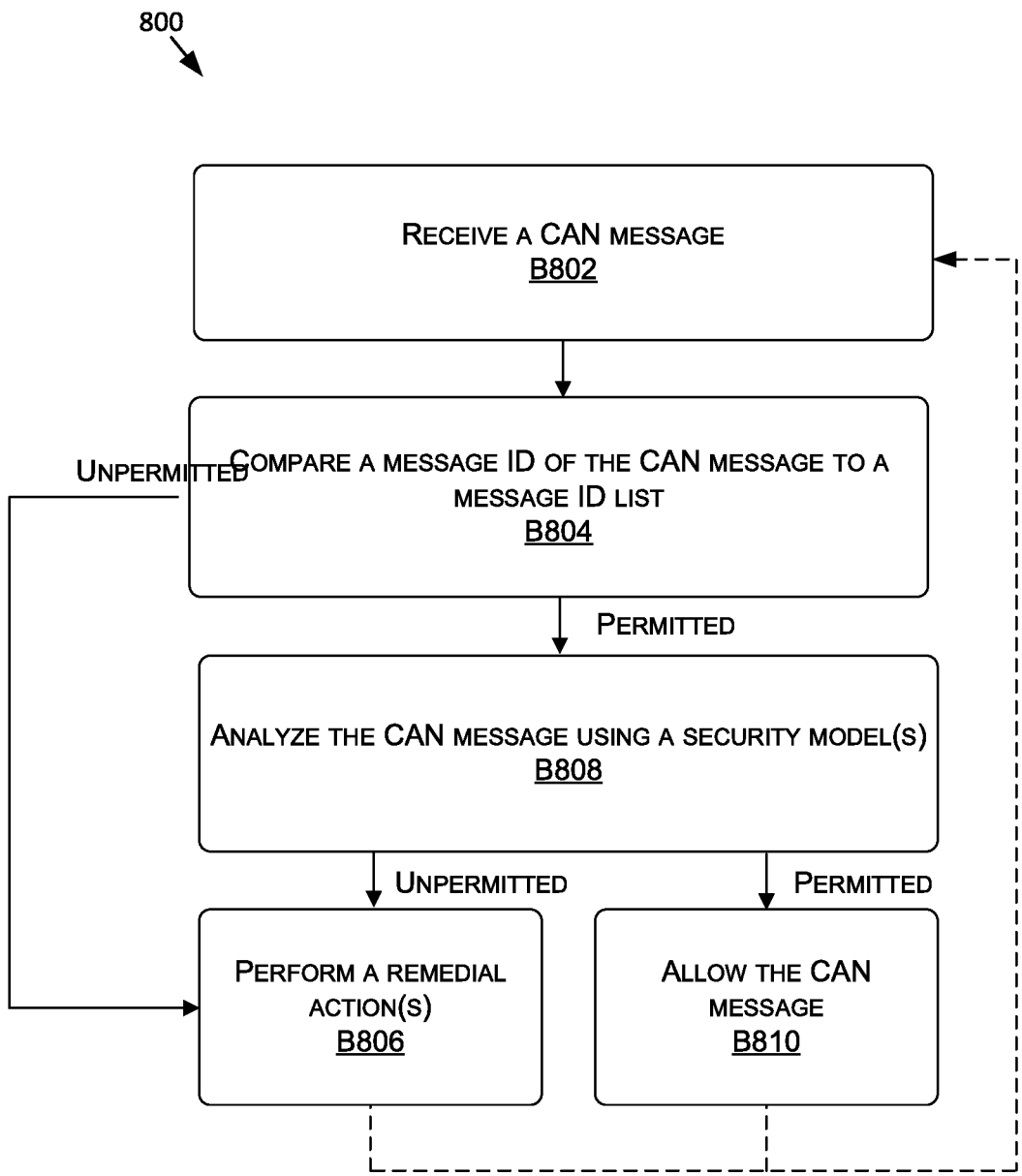
FIG. 8 is a flow diagram showing a method an IDPS may use to analyze CAN messages, in accordance with some embodiments of the present disclosure.
Figure 9:
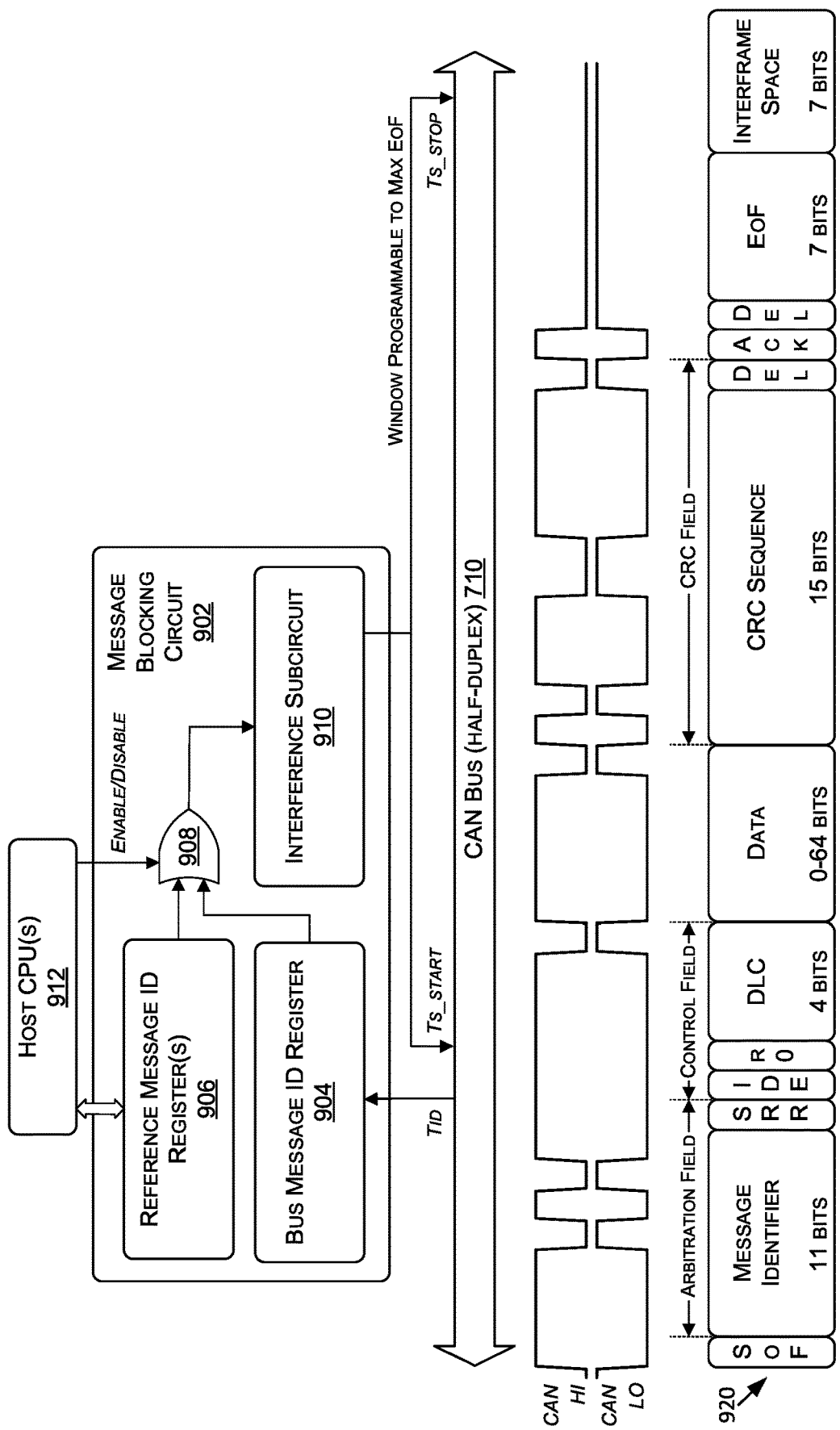
FIG. 9 is a diagram illustrating an example a message blocking circuit, in accordance with some embodiments of the present disclosure.

FIGS. 7, 8, and 9 provide examples of aspects which may be incorporated into the IDPS 122 for CAN-based Connections. It is noted that not all of these aspects are required and that CAN-based connections are provided as a particular example, with other types of connections (Vehicle Bus-based or otherwise) being within the scope of the description whenever appropriate.

Referring now to FIG. 7, FIG. 7 is a diagram illustrating examples of networking components that may be used to implement the IDPS 122, in accordance with some embodiments of the present disclosure. Communication channels for vehicle bus protocols, such as CAN, may be implemented using one or more internal vehicle buses. The internal vehicle buses may be virtual vehicle buses that appear to the Guest OSes 212A through 212N to be physical vehicle buses. To accomplish this, the security manager 232 and/or the communications manager 234 may include one or more virtual network components, such as controllers, transmitters/receivers, filters, etc.

In the example shown, the communication channels 252A and 252N may be implemented using an internal CAN bus 752A and/or an internal CAN over IP bus 752N. The internal CAN bus 752A and/or the internal CAN over IP bus 752N may be implemented in the virtualized environment 102 using one or more virtual components in the security engine 232A, the security engine 232N, and one or more virtualized network interfaces 724. The virtualized network interface 724 may provide a virtualized connection (e.g., a shared single connection) to one or more physical CAN interfaces 726, which in turn may provide access to a CAN bus(es) 710. The virtualized network interface 724 may correspond to the virtualized network interface 224N of FIG. 2B and the CAN bus(es) 710 may correspond to the hardware communication channel(s) 210N of FIG. 2B.

In the example of FIG. 7, the guest OSes 212A and 212N have CAN capability. However, as with other examples, the number of Guest OSes is for explanatory purposes only, as well as the number of guest OS with a particular type of network interface connectivity. The internal CAN bus 752A and the internal CAN over IP bus 752N link the Guest OSes 212A and 212N with the external CAN bus 710 that connects the ECUs 108, the TCU 110, and/or the sensors 106. The internal CAN bus 752A may be used when a CAN controller is shared by the guest OSes 212A and 212N and the internal CAN over IP bus 752N may be used when a "CAN over IP" (CAN/IP) solution is shared by the guest OSes 212A and 212N. For example, CAN over Ethernet may be used (e.g., when the IDPS 122 is connected to a microcontroller device operating as a CAN interface to/from an Ethernet transceiver).

Similar to FIG. 5A, the security engine 232A may include a firewall 702A and the security engine 232N may include a firewall 702N. Although, the security engine 232A and the security engine 232N are shown in both FIG. 5A and FIG. 7, these may be represent different security engines that are, for example, dedicated to CAN-based communications in FIG. 7 and IP-based communications in FIG. 5A, or the same security engines may be used (and/or the same firewalls). The firewalls 702N may use implementations of the threat detector 130 and the threat manager 132 to apply threat profiles to the inbound/outbound CAN traffic to and from both the CAN controller interfaces or CAN over IP using approaches described herein (e.g., as in FIG. 3 or FIG. 4).

The internal CAN bus 752A may be implemented using a broadcast transmit receive system according to a CAN protocol. The internal CAN over IP bus 752N may be implemented using IP messages, but the messages may be run through the same security engines 232A and 232N. For the internal CAN over IP bus 752N, the CAN interface 726 may include a CAN over IP transceiver that goes to the CAN bus 710, which may be separate from the hardware communication channel 210A and dedicated to CAN communications. For other types of vehicle bus protocols, other types of transceivers may be used, or a single transceiver may be capable of handling multiple vehicle bus protocols and busses.

The virtualized network interface 724 may implement CAN virtualization, and as such, may include receive (RX) acceptance filters 704A and 704N, used in conventional CAN hardware only for receiving communications using a safe list of message IDs. Where the RX acceptance filters 704A and 704N are included, they may be disabled as filtering may be performed using the more robust firewalls 702A and 702N. Further, any RX acceptance filter on the CAN interface 726 may be disabled, as it is typically not customizable for each guest OS 212A and 212N.

One or more implementations of the threat detector 130 and/or the threat manager 132 may correspond to the detection features of the firewalls 702A and 702N and/or the RX acceptance filters 704A and 704N, and those components may perform any of the various functionalities of the threat detector 130 and the threat manager 132 described herein.

The firewalls 702A and 702N may use multi-stage processing where a first stage may filter against a message ID list and may use other mechanisms of analysis, such as message frequencies, patterns, anomaly detection, machine learning, etc. FIG. 8 is used to describe some examples of how the CAN messages may be processed.

Now referring to FIG. 8, FIG. 8 is a flow diagram showing a method 800 the IDPS may use to analyze CAN messages, in accordance with some embodiments of the present disclosure. The method 800 may, for example, be performed in conjunction with the method 300 of FIG. 3. The method 800 may be performed for a CAN message being transmitted by the security engine 232A from the guest OS 212A to another guest OS or external component. However, the method 800 may similarly be performed on a CAN message being transmitted to the guest OS 212A. Also, while CAN messages are described with respect to FIG. 8, the method 800 may be performed on any suitable type of message, such as IP-based messages and/or other vehicle bus message types.

The method 800, at block B802, includes receiving a CAN message. For example, the security engine 232A may receive the CAN message being transmitted from the guest OS 212A. Where the CAN message is being transmitted to the guest OS 212A, block B802 may include the RX acceptance filter 704A receiving the CAN message, or block B802 may include the security engine 232A receiving the CAN message in either case.

The method 800, at block B804, includes comparing a message ID of the CAN message to a message ID list. For example, the threat detector 130 of the firewall 702A may compare the message ID of the CAN message to a list of message IDs that are to be allowed for transmittal from the guest OS 212A. This allow list may be implemented using a threat profile with the message IDs being configurable by the user. In contrast, when a message is being transmitted to the guest OS 212A, the RX acceptance filter 704A may compare the message ID of the CAN message to a list of message IDs that are to be blocked from receipt by the guest OS 212A. This block list may also be implemented by allowing the user to configure the RX acceptance filter 704A in CAN virtualization. In addition to or instead of the block list being implemented by the RX acceptance filter 704A, the block list may be implemented by the security engine 232A similar to the allow list. Further in some embodiments an allow list may instead be used for received messages and/or a block list may instead be used for transmitted messages.

If, at block B804, the CAN man message is unpermitted according to the list(s), the method 800 may proceed to block B806, which includes performing a remedial action(s). For example, the threat manager 132 of the firewall 702A or the RX acceptance filter 704A may perform any suitable combination of the remedial actions described herein (e.g., according to the threat profile). This may include using the logger 142 to create an entry for the suspect CAN message. This may also include notifying the guest OS 212A about the detected policy violation using the notifier 138 (e.g., that the message ID was not allowed when the CAN message is blocked on the TX/RX path). Notifications that are provided may also be available in the logs. Further, remedial actions may include using the mode selector 140 to select one or more modes. This may include the safe mode of system operation to ensure rogue CAN messages do not impact the overall functioning of the system. In some examples, the safe mode may be activated on repeated detection of security threats, such as according to the process 400 of FIG. 4. If the CAN message is determined to be unpermitted, the message may be blocked. The blocking of the message may be performed using a message blocking circuit 902 of FIG. 9 to block the CAN message on the CAN bus 710 and/or internally within the virtualized environment 102.

If, at block B804, the CAN message is permitted according to the list(s), the method 800 may proceed to block B808, which includes analyzing the CAN message using a security model(s). For example, the threat detector 130 of the firewall 702A may analyze the CAN message using one or more security models. The security models may include anomaly detection models, frequency of occurrence models, message pattern models, machine learning models, and/or other security models described herein. In other examples, if, at block B804, the CAN message is unpermitted according to the list(s), the method 800 may still proceed to block B808, such as where the remedial actions do not include blocking the CAN message. In some embodiments, block B08 using machine learning techniques to match the Message ID with message patterns, message frequency and traffic that are usually encountered over the communication channel. This analysis may take into account the direction of the traffic.

If, at block B808, the CAN message is permitted according to the analysis using the security models (e.g., the threat detector 130 determines the CAN message does not represent or is not part of a security threat/event), the method 800 may proceed to block B810, which includes allowing the CAN message. For example, the security engine 232A may allow the CAN message to proceed to its destination.

If, at block B808, the CAN message is unpermitted according to the analysis using the security model(s) (e.g., the threat detector 130 determines the CAN message does represent or is part of a security threat/event), the method 800 may proceed to block B806, where the threat manager 132 may perform one or more remedial actions according to the threat profile (which may include blocking or allowing the CAN message).

In non-limiting examples of the method 800, the threat detector 130 may check the message ID of each incoming/outgoing CAN message against pre-configured Message ID lists. The CAN message may be in a Normal or Extended Frame format with an 11 or 29 bit identifier. On a TX path, block B804 may be performed by the firewall 702A of the security manager 232 where the message ID is checked against a pre-configured allow list before being allowed to pass through to CAN Virtualization on the communications manager 234. This allow list may be used to block all messages by default unless specified in the allow list. If the message ID check fails, the method 800 may proceed to block B806, where one or more remedial actions may be performed using the threat manager 132, such as blocking the message. On the RX path, block B804 may be performed by the RX acceptance filter 704A of the communications manager 234 with the block list and an option to configure the block list using CAN Virtualization. The default behavior of the RX acceptance filter 704A may be to allow all traffic (e.g., to proceed to the security engine 232A) unless specified and the block list may be configured as an acceptance filtering mechanism that resides on the virtualized CAN controller and performed the block B806.

In any example, a block list used by the firewall 702A and/or the RX acceptance filter 704A on receipt of a message may include the message ID of the guest OS 212A. Using this approach, each CAN Controller may be able to monitor its own message ID on the internal CAN bus 752A (and/or internal CAN over IP bus 752N) and perform remedial actions at block B806 if it finds an unauthorized instance of the message ID on the bus, which may indicate spoofing. For example, the remedial action may include using the message blocking circuit 902 of FIG. 9 to raise arbitration thereby corrupting the CRC on the undesired CAN message being currently transmitted by an attacker on the CAN bus 710. This may raise an error on the CAN bus 710 causing the frame to be ignored by the CAN devices on the CAN bus 710.

Examples of Blocking CAN Messages on CAN Buses

The present disclosure provides for filtering a CAN message from a CAN bus, such that devices on the CAN bus do not act upon the CAN message. Interconnectedness and connectivity of the vehicle 1200 to the outside world result in significant security concerns. The CAN protocol was originally designed at a time when vehicles did not include the interconnect interfaces of modern vehicles, and as a result, CAN networks are known to be vulnerable to attacks. Once access is gained to a conventional CAN network, any unsolicited message may be sent on the CAN bus. Once this happens, not much can be done in conventional implementations to stop the rogue message from reaching the target ECU and causing mayhem. Since a CAN bus may carry actuation signals in vehicles, the severity of risks associated with hacking the CAN bus escalates dramatically in the case of a self-driving vehicle. Prior to the present disclosure, there were no known methods that allow for the ability to reject a packet from the CAN bus in real-time. In contrast, the present disclosure provides approaches to inspect a CAN message and block reception of the CAN message in real-time.

Disclosed approaches may be used to enable a CAN device to detect a malicious communication over the CAN bus 710 and protect itself and other devices on the CAN bus 710—a process that is not possible using conventional systems. Generally, disclosed approaches involve corrupting the CAN message on the CAN bus 710 so that the CAN message will be ignored by other components. This may be accomplished by raising arbitration when an invalid message ID is found on the CAN bus and corrupting the CRC field of the CAN message to raise an Error Flag on the CAN Bus.

Disclosed approaches may be used with the IDPS 122, but are more generally applicable to any device and software connected to a CAN bus. In disclosed approaches, during the transmission of a CAN message on the CAN bus, and to filter the CAN message from the CAN bus, a message blocking circuit (e.g., the message blocking circuit 902 of FIG. 9) may analyze the message identifier (ID) of the CAN message to determine whether an unwanted CAN message is being transmitted. Using an interference subcircuit, the message blocking circuit may corrupt the CAN message on the CAN bus to prevent the CAN message from being used by other devices on the CAN bus. To do so, the interference circuit may raise arbitration during transmission of the CAN message, thereby corrupting the Cyclic Redundancy Check (CRC) on the CAN message. This prevents the devices from successfully reading the payload of the CAN message (e.g., because the devices will no longer recognize the CAN message as being valid).

Referring now to FIG. 9, FIG. 9 is a diagram illustrating an example of the message blocking circuit 902, in accordance with some embodiments of the present disclosure. The message blocking circuit 902 may include, for example, a bus message ID register 904, one or more reference message ID registers 906, one or more logic gates 908, and an interference subcircuit 910. The message blocking circuit 902 may also include additional components that are not shown.

The bus message ID register 904 is configured to receive a message ID of a CAN message as it is being transmitted on the CAN bus 710. FIG. 9 shows CAN HI and CAN LO waveforms that correspond to a typical CAN message that may be transmitted on the CAN bus 710. FIG. 9 also shows CAN bus data 920 that may correspond to the CAN HI and CAN LO waveforms. The message ID may be received by the bus message ID register 904 from the arbitration field of the CAN bus data 920 as it is being transmitted on the CAN bus 710.

The reference message ID register(s) 906 include a list of message IDs the message blocking circuit 902 may use to determine whether to block the CAN message from the CAN bus 710. The reference message ID register(s) 906 may be configurable by a host CPU 912 (e.g., 1206 of FIG. 12C), which may host the hypervisor 220 and/or the IDPS 122. However, the host CPU 912 may generally be any CPU as the message blocking circuit 902 may be implemented without implementing the IDPS 122 and/or independent or separate from the IDPS 122. As examples, the reference message ID register may include either a list of message IDs to allow on the CAN bus 710 or a list of message IDs to block from the CAN bus 710. More generally, the data stored in the reference message ID register(s) 906 may refer to data the message blocking circuit 902 may analyze (e.g., compare to the current message ID) to determine whether to block one or more CAN messages from the CAN bus 710. This analysis may be performed using the logic gate(s) 908.

The logic gate 908 may receive and compare the message IDs from the reference message ID register(s) 906 and the bus message ID register 904. The logic gate 908 may further generate an output signal indicative of a result of the comparison. For example, one output signal (e.g., Hi or Low) may indicate the CAN message is to be blocked, and another output signal (e.g., Hi or Low) may indicate the CAN message is to be allowed. Where the reference message ID register(s) 906 corresponds to an allow list, the logic gate 908 may be configured to generate an output signal indicating the CAN message is to be blocked when the CAN message matches a message ID in the reference message ID register(s) 906, otherwise the output signal may indicate the CAN message is to be allowed. As another example, where the reference message ID register(s) 906 corresponds to a block list, the logic gate 908 may be configured to generate an output signal indicating the CAN message is to be blocked when the CAN message does not match any message ID in the reference message ID register(s) 906, otherwise the output signal may indicate the CAN message is to be allowed.

The message blocking circuit 902 may be enabled or disabled using an Enable/Disable signal, such as by the host CPU 912. When the message blocking circuit 902 is disabled, the output signal may indicate otherwise the output signal may indicate CAN messages are to be allowed regardless of contents of the reference message ID registers 906 and the bus message ID register 904.

The interference subcircuit 910 may be configured to, responsive to the output signal, perform corruption of the CAN message on the CAN bus 710. To do so, the interference subcircuit 910 may raise arbitration during transmission of the CAN message, thereby corrupting the Cyclic Redundancy Check (CRC) on the CAN message. This prevents the TCU 110, the ECUs 108, or other devices that may be on the CAN bus 710 from successfully reading the payload of the CAN message (e.g., because the devices will no longer recognize the CAN message as being valid).

The message ID of the CAN message may be read from the CAN bus at time $T_{ID}$. Between time $T_{ID}$ and time $T_{s\_start}$, the logic gate 908 may generate the output signal used by the interference subcircuit 910 to trigger corruption of the CAN message. The corruption of the CAN message may be performed by the interference subcircuit 910 in a window of time from the time $T_{s\_start}$ and time $T_{s\_stop}$. This window of time may be programmable, such as by the host CPU 912. The window of time and the time $T_{ID}$ may be time synced to the CAN controller data frame in order to properly read the message ID and corrupt the CAN bus data 920. Generally, the interference subcircuit 910 may corrupt a CAN message by altering the CAN HI and/or CAN LO waveforms. This may include, for example, holding the CAN bus 710 high, holding the CAN bus 710 low, and/or alternating between high and low on the CAN bus 710, which may be programmable, such as by the host CPU 912. The corruption may be timed to corrupt the CRC field. While in other examples, the interference subcircuit 910 may corrupt the CAN message by altering the control field, the CRC field occurs later in a CAN message, providing more time for processing the message ID from the CAN bus 710.

In some embodiments, the interference subcircuit 910 uses an arbitration mechanism (e.g., available in standard CAN interface implementations) when the output signal indicates an invalid CAN message is being transmitted on the CAN bus 710. Typically, implementations of CAN interfaces use the arbitration mechanism to determine the order in which components get to transmit data during a given period. Frames with the highest assigned identifier (lowest message ID) may get access to the CAN bus 710 without delay, and the other components having lower priority wait for their turn. Raising the arbitration mechanism when the output signal indicates an invalid CAN message is being transmitted on the CAN bus 710 may effectively corrupts the CRC field. This will raise an Error Flag on the CAN Bus 710 and the CAN message will hence be ignored by the ECUs 108, the TSU 110, and/or other devices on the CAN bus 710, preventing them from being affected by a potential attack.

By using the message blocking circuit 902, the IDPS 122 or other software security solution may not only raise an alarm or take other software based actions, but also take preventive/corrective action when an anomaly is found on the CAN bus 710. In some embodiments, the IC(s) 204 of FIG. 2A may include a CAN hardware controller (e.g., the CAN interface 726), which may implement the message blocking circuit 902. For example, the CAN hardware controller may be in a partition of the communications manager 234 and configured with an open hardware filter that monitors the CAN messages on the CAN bus 710. The message blocking circuit 902 may be implemented as a filter that is configurable on the communications manager 234 with a complete list of all the message IDs that are allowed/possible for the CAN Ring. The list of message IDs may be configured by the host CPU 912 loading the message IDs into the reference message ID registers 906. When the first 11 bits (or 29 bits for Extended Frame) are read and an invalid message ID is detected using the logic gates 908, the CAN Controller may raise its arbitration and corrupt the CRC field of that frame. This will cause the target ECU of the CAN message to ignore the CAN frame, thereby protecting it from attacks. While particular examples are provided, the IDPS 122 may configure and implement the message blocking circuit 902 in other ways, such as with a block list and/or using the security manager 232 (e.g., a security engine may configure the reference message ID registers 906).

Figure 10:
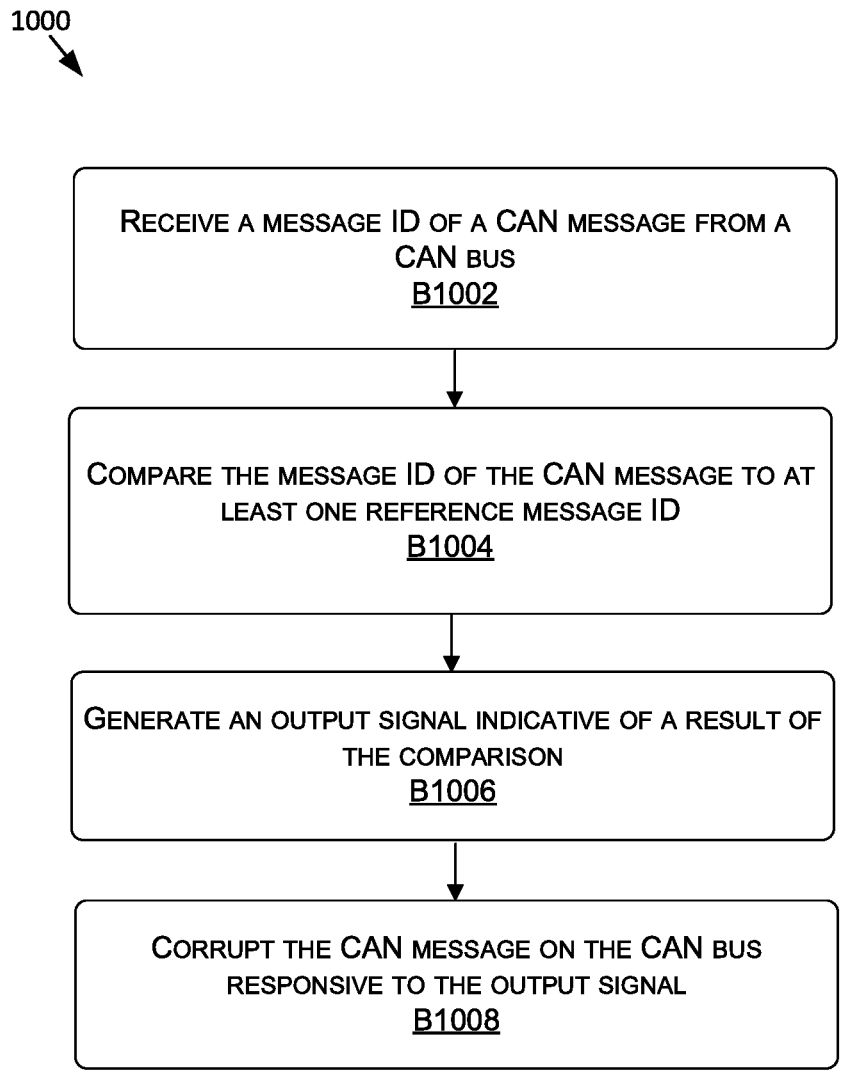
FIG. 10 is a flow diagram showing a method for a message blocking circuit to block a CAN message on a CAN bus, in accordance with some embodiments of the present disclosure.

Referring now to FIG. 10, FIG. 10 is a flow diagram showing a method 1000 for the message blocking circuit 902 to block a CAN message on the CAN bus 710, in accordance with some embodiments of the present disclosure. The method 1000, at block B1002, includes receiving a message ID of a CAN message from a CAN bus. For example, the bus message ID register 904 may receive the message ID of a CAN message from the CAN bus 710.

The method 1000, at block B1004, includes comparing the message ID of the CAN message to at least one reference message ID. For example, the logic gates 908 may compare the message ID of the CAN message from the bus message ID register 904 to one or more reference message IDs from the reference message ID register(s) 906.

The method 1000, at block B1006, includes generating an output signal indicative of a result of the comparison. For example, the logic gates 908 may provide an output signal to the interference subcircuit based on the comparison, which indicates a result of the comparison.

The method 1000, at block B1008, includes corrupting the CAN message on the CAN bus responsive to the output signal. For example, the interference subcircuit 910 may corrupt the CAN message on the CAN bus 710 when the output signal indicates the CAN message is an invalid CAN message. This may include raising arbitration and corrupting the CRC field from the time $T_{s\_start}$ to the time $T_{s\_stop}$.

Figure 11:
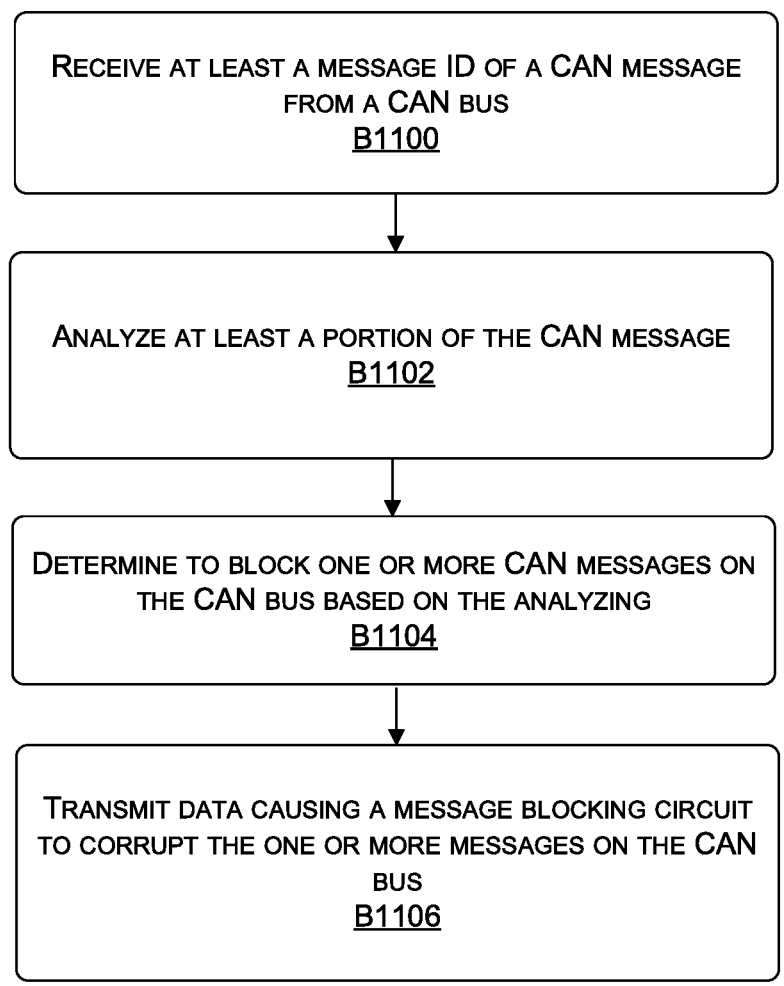
FIG. 11 is a flow diagram showing a method for using a message blocking circuit to block a CAN message on a CAN bus, in accordance with some embodiments of the present disclosure.

Referring now to FIG. 11, FIG. 11 is a flow diagram showing a method 1100 for using the message blocking circuit 902 to block a CAN message on the CAN bus 710, in accordance with some embodiments of the present disclosure.

The method 1100, at block B1102, includes receiving at least a message ID of a CAN message from a CAN bus. For example, the RX acceptance filter 704A, the firewall 702A, and/or other software component of the IDPS 122 may receive a message ID of a CAN message from the CAN bus 710.

The method 1100, at block B1104, includes analyzing at least a portion of the CAN message. For example, the RX acceptance filter 704A, the firewall 702A, and/or other software component of the IDPS 122 may analyze at least the message ID of the CAN message from the CAN bus 710. This may include using the threat detector 130 and/or the block list and/or allow list described herein to determine whether the CAN message corresponds to a security threat or event.

The method 1100, at block B1106, includes determining to block one or more CAN message on the CAN bus based on the analyzing. For example, the component(s) of the IDPS 122 may determine to block the CAN message. Additionally or alternatively, the IDPS 122 may determine to block one or more messages that have the message ID. Additionally or alternatively, the IDPS 122 may determine a set of message IDs to block from the CAN bus 710 (e.g., those on a block list or those not on an allow list). Where multiple CAN messages are to be blocked, they may be blocked for a specified period of time or until some event occurs (e.g., system rest, safe mode deactivation, etc.). In some examples, the CAN message(s) to be blocked and/or the duration of blocking message may be defined by the threat profile, and the threat manager 132 may implement the blocking.

The method 1100, at block B1108, includes transmitting data causing a message blocking circuit to corrupt the one or more message on the CAN bus. For example, the IDPS 122 may configure the message blocking circuit 902 to block one or more messages using the reference message ID register(s) 906 and/or the Enable/Disable signal. This may include using the host CPU 912 to add the message ID(s) determined from the block B1106 to the reference message ID register(s) 906 and/or removing the message ID(s) from the reference message ID register(s) 906 to cause the determined message(s) to be blocked. Where the blocking is to occur for a period of time or until an event occurs, the IDPS 122 may control the Enable/Disable signal so the blocking is deactivated after the period of time or event is detected. As another example, the period of time may be provided to and implemented on the message blocking circuit 902 (e.g., as a value). It is noted that the method 1100 may be performed using a message blocking circuit that is configured different than the message blocking circuit 902. Further, the comparison performed by the logic gate(s) 908 may be performed by the host CPU 912 or otherwise in software if it may be accomplished fast enough to block the designed message(s) using the interference subcircuit 910.

Figure 12A:
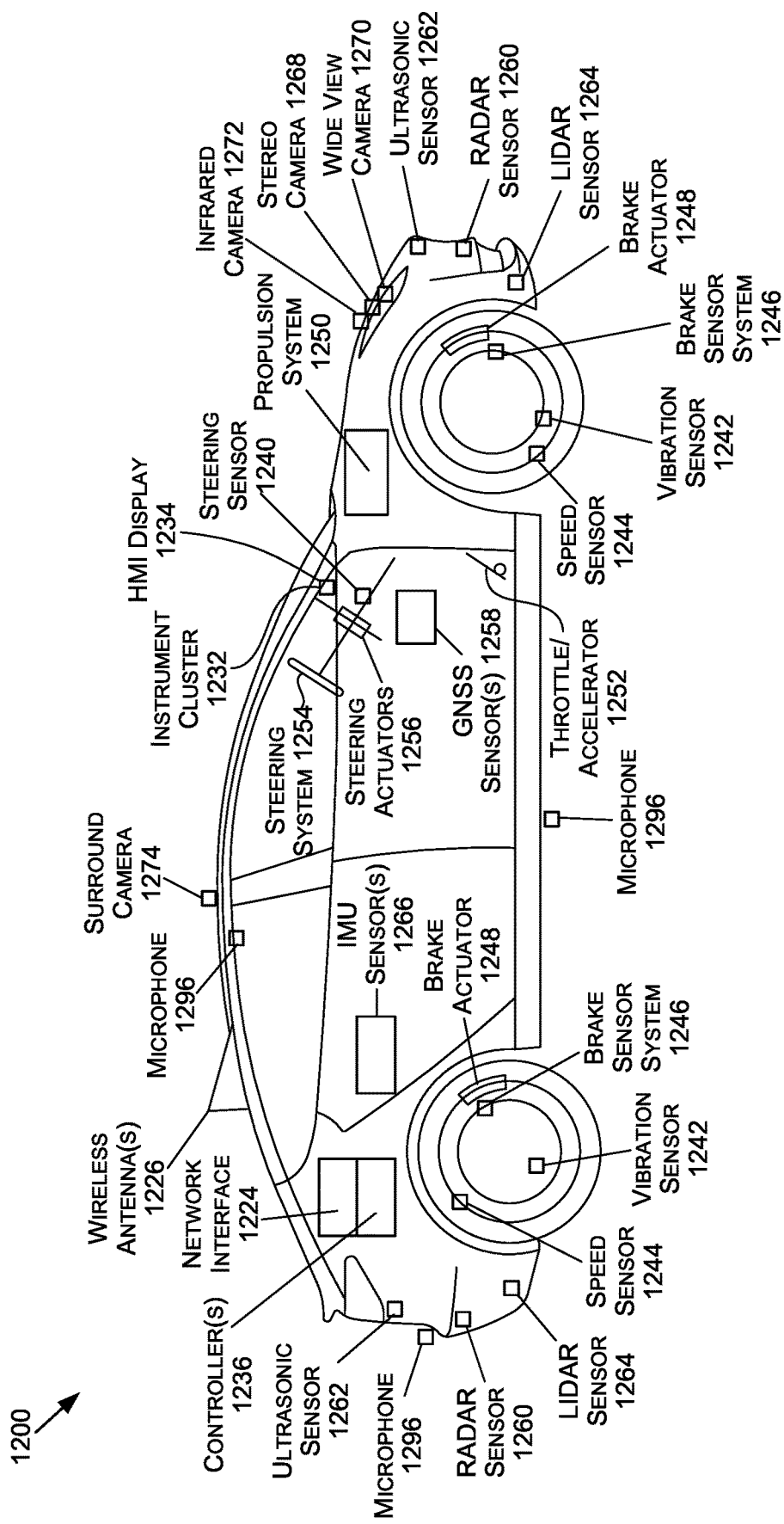
FIG. 12A is an illustration of an example autonomous vehicle, in accordance with some embodiments of the present disclosure.

FIG. 12A is an illustration of an example autonomous vehicle 1200, in accordance with some embodiments of the present disclosure. The autonomous vehicle 1200 (alternatively referred to herein as the "vehicle 1200") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1200 may be capable of functionality in accordance with one or more of Level 3-Level 5 of the autonomous driving levels. For example, the vehicle 1200 may be capable of conditional automation (Level 3), high automation (Level 4), and/or full automation (Level 5), depending on the embodiment.

The vehicle 1200 may include components such as a chassis, a vehicle body, wheels (e.g., 2, 4, 6, 8, 18, etc.), tires, axles, and other components of a vehicle. The vehicle 1200 may include a propulsion system 1250, such as an internal combustion engine, hybrid electric power plant, an all-electric engine, and/or another propulsion system type. The propulsion system 1250 may be connected to a drive train of the vehicle 1200, which may include a transmission, to enable the propulsion of the vehicle 1200. The propulsion system 1250 may be controlled in response to receiving signals from the throttle/accelerator 1252.

A steering system 1254, which may include a steering wheel, may be used to steer the vehicle 1200 (e.g., along a desired path or route) when the propulsion system 1250 is operating (e.g., when the vehicle is in motion). The steering system 1254 may receive signals from a steering actuator 1256. The steering wheel may be optional for full automation (Level 5) functionality.

The brake sensor system 1246 may be used to operate the vehicle brakes in response to receiving signals from the brake actuators 1248 and/or brake sensors.

Controller(s) 1236, which may include one or more system on chips (SoCs) 1204 (FIG. 12C) and/or GPU(s), may provide signals (e.g., representative of commands) to one or more components and/or systems of the vehicle 1200. For example, the controller(s) may send signals to operate the vehicle brakes via one or more brake actuators 1248, to operate the steering system 1254 via one or more steering actuators 1256, to operate the propulsion system 1250 via one or more throttle/accelerators 1252. The controller(s) 1236 may include one or more onboard (e.g., integrated) computing devices (e.g., supercomputers) that process sensor signals, and output operation commands (e.g., signals representing commands) to enable autonomous driving and/or to assist a human driver in driving the vehicle 1200. The controller(s) 1236 may include a first controller 1236 for autonomous driving functions, a second controller 1236 for functional safety functions, a third controller 1236 for artificial intelligence functionality (e.g., computer vision), a fourth controller 1236 for infotainment functionality, a fifth controller 1236 for redundancy in emergency conditions, and/or other controllers. In some examples, a single controller 1236 may handle two or more of the above functionalities, two or more controllers 1236 may handle a single functionality, and/or any combination thereof.

The controller(s) 1236 may provide the signals for controlling one or more components and/or systems of the vehicle 1200 in response to sensor data received from one or more sensors (e.g., sensor inputs). The sensor data may be received from, for example and without limitation, global navigation satellite systems sensor(s) 1258 (e.g., Global Positioning System sensor(s)), RADAR sensor(s) 1260, ultrasonic sensor(s) 1262, LIDAR sensor(s) 1264, inertial measurement unit (IMU) sensor(s) 1266 (e.g., accelerometer(s), gyroscope(s), magnetic compass(es), magnetometer(s), etc.), microphone(s) 1296, stereo camera(s) 1268, wide-view camera(s) 1270 (e.g., fisheye cameras), infrared camera(s) 1272, surround camera(s) 1274 (e.g., 360 degree cameras), long-range and/or mid-range camera(s) 1298, speed sensor(s) 1244 (e.g., for measuring the speed of the vehicle 1200), vibration sensor(s) 1242, steering sensor(s)

1240, brake sensor(s) (e.g., as part of the brake sensor system 1246), and/or other sensor types.

One or more of the controller(s) 1236 may receive inputs (e.g., represented by input data) from an instrument cluster 1232 of the vehicle 1200 and provide outputs (e.g., represented by output data, display data, etc.) via a human-machine interface (HMI) display 1234, an audible annunciator, a loudspeaker, and/or via other components of the vehicle 1200. The outputs may include information such as vehicle velocity, speed, time, map data (e.g., the HD map 1222 of FIG. 12C), location data (e.g., the vehicle's 1200 location, such as on a map), direction, location of other vehicles (e.g., an occupancy grid), information about objects and status of objects as perceived by the controller(s) 1236, etc. For example, the HMI display 1234 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1200 further includes a network interface 1224 which may use one or more wireless antenna(s) 1226 and/or modem(s) to communicate over one or more networks. For example, the network interface 1224 may be capable of communication over LTE, WCDMA, UMTS, GSM, CDMA2000, etc. The wireless antenna(s) 1226 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LP-WANs), such as LoRaWAN, SigFox, etc.

Figure 12B:
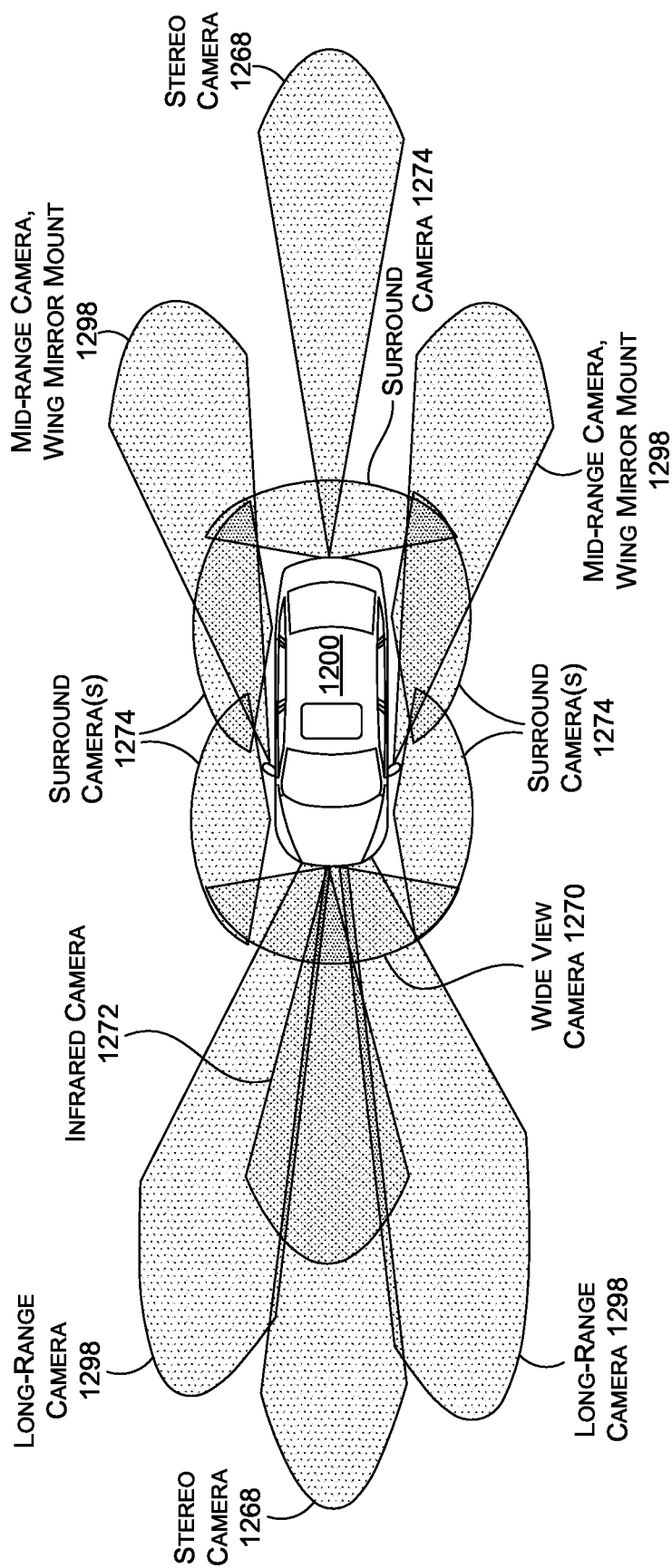
FIG. 12B is an example of camera locations and fields of view for the example autonomous vehicle of FIG. 12A, in accordance with some embodiments of the present disclosure.

FIG. 12B is an example of camera locations and fields of view for the example autonomous vehicle 1200 of FIG. 12A, in accordance with some embodiments of the present disclosure. The cameras and respective fields of view are one example embodiment and are not intended to be limiting. For example, additional and/or alternative cameras may be included and/or the cameras may be located at different locations on the vehicle 1200.

The camera types for the cameras may include, but are not limited to, digital cameras that may be adapted for use with the components and/or systems of the vehicle 1200. The camera(s) may operate at automotive safety integrity level (ASIL) B and/or at another ASIL. The camera types may be capable of any image capture rate, such as 60 frames per second (fps), 1220 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1200 (e.g., front-facing cameras) may be used for surround view, to help identify forward facing paths and obstacles, as well aid in, with the help of one or more controllers 1236 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1270 that may be used to perceive objects coming into view from the periphery (e.g., pedestrians, crossing traffic or bicycles). Although only one wide-view camera is illustrated in FIG. 12B, there may any number of wide-view cameras 1270 on the vehicle 1200. In addition, long-range camera(s) 1298 (e.g., a long-view stereo camera pair) may be used for depth-based object detection, especially for objects for which a neural network has not yet been trained. The long-range camera(s) 1298 may also be used for object detection and classification, as well as basic object tracking.

One or more stereo cameras 1268 may also be included in a front-facing configuration. The stereo camera(s) 1268 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1268 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1268 may be used in addition to, or alternatively from, those described herein.

Cameras with a field of view that include portions of the environment to the side of the vehicle 1200 (e.g., side-view cameras) may be used for surround view, providing information used to create and update the occupancy grid, as well as to generate side impact collision warnings. For example, surround camera(s) 1274 (e.g., four surround cameras 1274 as illustrated in FIG. 12B) may be positioned to on the vehicle 1200. The surround camera(s) 1274 may include wide-view camera(s) 1270, fisheye camera(s), 360 degree camera(s), and/or the like. Four example, four fisheye cameras may be positioned on the vehicle's front, rear, and sides. In an alternative arrangement, the vehicle may use three surround camera(s) 1274 (e.g., left, right, and rear), and may leverage one or more other camera(s) (e.g., a forward-facing camera) as a fourth surround view camera.

Cameras with a field of view that include portions of the environment to the rear of the vehicle 1200 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1298, stereo camera(s) 1268), infrared camera(s) 1272, etc.), as described herein.

Figure 12C:
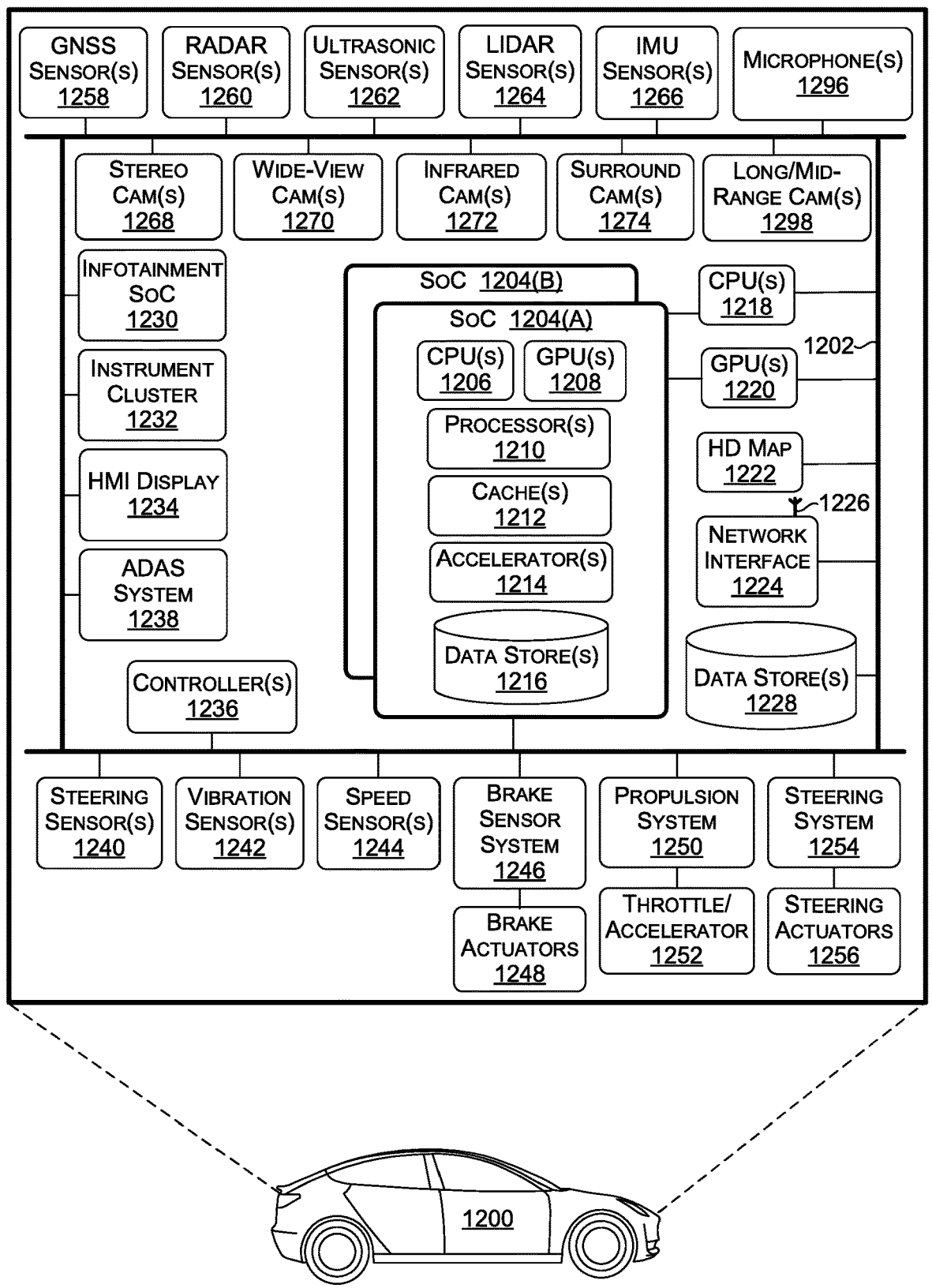
FIG. 12C is a block diagram of an example system architecture for the example autonomous vehicle of FIG. 12A, in accordance with some embodiments of the present disclosure.

FIG. 12C is a block diagram of an example system architecture for the example autonomous vehicle 1200 of FIG. 12A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1200 in FIG. 12C are illustrated as being connected via bus 1202. The bus 1202 may include a Controller Area Network (CAN) data interface (alternatively referred to herein as a "CAN bus"). A CAN may be a network inside the vehicle 1200 used to aid in control of various features and functionality of the vehicle 1200, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1202 is described herein as being a CAN bus, this is not intended to be limiting. For example, in addition to, or alternatively from, the CAN bus, FlexRay and/or Ethernet may be used. Additionally, although a single line is used to represent the bus 1202, this is not intended to be limiting. For example, there may be any number of busses 1202, which may include one or more CAN busses, one or more FlexRay busses, one or more Ethernet busses, and/or one or more other types of busses using a different protocol. In some examples, two or more busses 1202 may be used to perform different functions, and/or may be used for redundancy. For example, a first bus 1202 may be used for collision avoidance functionality and a second bus 1202 may be used for actuation control. In any example, each bus 1202 may communicate with any of the components of the vehicle 1200, and two or more busses 1202 may communicate with the same components. In some examples, each SoC 1204, each controller 1236, and/or each computer within the vehicle may have access to the same input data (e.g., inputs from sensors of the vehicle 1200), and may be connected to a common bus, such the CAN bus.

The vehicle 1200 may include one or more controller(s) 1236, such as those described herein with respect to FIG. 12A. The controller(s) 1236 may be used for a variety of functions. The controller(s) 1236 may be coupled to any of the various other components and systems of the vehicle 1200, and may be used for control of the vehicle 1200, artificial intelligence of the vehicle 1200, infotainment for the vehicle 1200, and/or the like.

The vehicle 1200 may include a system(s) on a chip (SoC) 1204. The SoC 1204 may include CPU(s) 1206, GPU(s) 1208, processor(s) 1210, cache(s) 1212, accelerator(s) 1214, data store(s) 1216, and/or other components and features not illustrated. The SoC(s) 1204 may be used to control the vehicle 1200 in a variety of platforms and systems. For example, the SoC(s) 1204 may be combined in a system (e.g., the system of the vehicle 1200) with an HD map 1222 which may obtain map refreshes and/or updates via a network interface 1224 from one or more servers (e.g., server(s) 1278 of FIG. 12D).

The CPU(s) 1206 may include a CPU cluster or CPU complex (alternatively referred to herein as a "CCPLEX"). The CPU(s) 1206 may include multiple cores and/or L2 caches. For example, in some embodiments, the CPU(s) 1206 may include eight cores in a coherent multi-processor configuration. In some embodiments, the CPU(s) 1206 may include four dual-core clusters where each cluster has a dedicated L2 cache (e.g., a 2 MB L2 cache). The CPU(s) 1206 (e.g., the CCPLEX) may be configured to support simultaneous cluster operation enabling any combination of the clusters of the CPU(s) 1206 to be active at any given time.

The CPU(s) 1206 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1206 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1208 may include an integrated GPU (alternatively referred to herein as an "iGPU"). The GPU(s) 1208 may be programmable and may be efficient for parallel workloads. The GPU(s) 1208, in some examples, may use an enhanced tensor instruction set. The GPU(s) 1208 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1208 may include at least eight streaming microprocessors. The GPU(s) 1208 may use compute application programming interface(s) (API(s)). In addition, the GPU(s) 1208 may use one or more parallel computing platforms and/or programming models (e.g., NVIDIA's CUDA).

The GPU(s) 1208 may be power-optimized for best performance in automotive and embedded use cases. For example, the GPU(s) 1208 may be fabricated on a Fin field-effect transistor (FinFET). However, this is not intended to be limiting and the GPU(s) 1208 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1208 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1208 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1208 to access the CPU(s) 1206 page tables directly. In such examples, when the GPU(s) 1208 memory management unit (MMU) experiences a miss, an address translation request may be transmitted to the CPU(s) 1206. In response, the CPU(s) 1206 may look in its page tables for the virtual-to-physical mapping for the address and transmits the translation back to the GPU(s) 1208. As such, unified memory technology may allow a single unified virtual address space for memory of both the CPU(s) 1206 and the GPU(s) 1208, thereby simplifying the GPU(s) 1208 programming and porting of applications to the GPU(s) 1208.

In addition, the GPU(s) 1208 may include an access counter that may keep track of the frequency of access of the GPU(s) 1208 to memory of other processors. The access counter may help ensure that memory pages are moved to the physical memory of the processor that is accessing the pages most frequently.

The SoC(s) 1204 may include any number of cache(s) 1212, including those described herein. For example, the cache(s) 1212 may include an L3 cache that is available to both the CPU(s) 1206 and the GPU(s) 1208 (e.g., that is connected both the CPU(s) 1206 and the GPU(s) 1208). The cache(s) 1212 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1204 may include one or more accelerators 1214 (e.g., hardware accelerators, software accelerators, or a combination thereof). For example, the SoC(s) 1204 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1208 and to off-load some of the tasks of the GPU(s) 1208 (e.g., to free up more cycles of the GPU(s) 1208 for performing other tasks). As an example, the accelerator(s) 1214 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1214 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1208, and by using an inference accelerator, for example, a designer may target either the DLA(s) or the GPU(s) 1208 for any function. For example, the designer may focus processing of CNNs and floating point operations on the DLA(s) and leave other functions to the GPU(s) 1208 and/or other accelerator(s) 1214.

The accelerator(s) 1214 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1206. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1214 (e.g., the hardware acceleration cluster) may include a computer vision network on-chip and SRAM, for providing a high-bandwidth, low latency SRAM for the accelerator(s) 1214. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1204 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1214 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1266 output that correlates with the vehicle 1200 orientation, distance, 3D location estimates of the object obtained from the neural network and/or other sensors (e.g., LIDAR sensor(s) 1264 or RADAR sensor(s) 1260), among others.

The SoC(s) 1204 may include data store(s) 1216 (e.g., memory). The data store(s) 1216 may be on-chip memory of the SoC(s) 1204, which may store neural networks to be executed on the GPU and/or the DLA. In some examples, the data store(s) 1216 may be large enough in capacity to store multiple instances of neural networks for redundancy and safety. The data store(s) 1212 may comprise L2 or L3 cache(s) 1212. Reference to the data store(s) 1216 may include reference to the memory associated with the PVA, DLA, and/or other accelerator(s) 1214, as described herein.

The SoC(s) 1204 may include one or more processor(s) 1210 (e.g., embedded processors). The processor(s) 1210 may include a boot and power management processor that may be a dedicated processor and subsystem to handle boot power and management functions and related security enforcement. The boot and power management processor may be a part of the SoC(s) 1204 boot sequence and may provide runtime power management services. The boot power and management processor may provide clock and voltage programming, assistance in system low power state transitions, management of SoC(s) 1204 thermals and temperature sensors, and/or management of the SoC(s) 1204 power states. Each temperature sensor may be implemented as a ring-oscillator whose output frequency is proportional to temperature, and the SoC(s) 1204 may use the ring-oscillators to detect temperatures of the CPU(s) 1206, GPU(s) 1208, and/or accelerator(s) 1214. If temperatures are determined to exceed a threshold, the boot and power management processor may enter a temperature fault routine and put the SoC(s) 1204 into a lower power state and/or put the vehicle 1200 into a chauffeur to safe stop mode (e.g., bring the vehicle 1200 to a safe stop).

The processor(s) 1210 may further include a set of embedded processors that may serve as an audio processing engine. The audio processing engine may be an audio subsystem that enables full hardware support for multichannel audio over multiple interfaces, and a broad and flexible range of audio I/O interfaces. In some examples, the audio processing engine is a dedicated processor core with a digital signal processor with dedicated RAM.

The processor(s) 1210 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1210 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1210 may further include a real-time camera engine that may include a dedicated processor subsystem for handling real-time camera management.

The processor(s) 1210 may further include a high-dynamic range signal processor that may include an image signal processor that is a hardware engine that is part of the camera processing pipeline.

The processor(s) 1210 may include a video image compositor that may be a processing block (e.g., implemented on a microprocessor) that implements video post-processing functions needed by a video playback application to produce the final image for the player window. The video image compositor may perform lens distortion correction on wide-view camera(s) 1270, surround camera(s) 1274, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1208 is not required to continuously render new surfaces. Even when the GPU(s) 1208 is powered on and active doing 3D rendering, the video image compositor may be used to offload the GPU(s) 1208 to improve performance and responsiveness.

The SoC(s) 1204 may further include a mobile industry processor interface (MIPI) camera serial interface for receiving video and input from cameras, a high-speed interface, and/or a video input block that may be used for camera and related pixel input functions. The SoC(s) 1204 may further include an input/output controller(s) that may be controlled by software and may be used for receiving I/O signals that are uncommitted to a specific role.

The SoC(s) 1204 may further include a broad range of peripheral interfaces to enable communication with peripherals, audio codecs, power management, and/or other devices. The SoC(s) 1204 may be used to process data from cameras (e.g., connected over Gigabit Multimedia Serial Link and Ethernet), sensors (e.g., LIDAR sensor(s) 1264, RADAR sensor(s) 1260, etc. that may be connected over Ethernet), data from bus 1202 (e.g., speed of vehicle 1200, steering wheel position, etc.), data from GNSS sensor(s) 1258 (e.g., connected over Ethernet or CAN bus). The SoC(s) 1204 may further include dedicated high-performance mass storage controllers that may include their own DMA engines, and that may be used to free the CPU(s) 1206 from routine data management tasks.

The SoC(s) 1204 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1204 may be faster, more reliable, and even more energy-efficient and space-efficient than conventional systems. For example, the accelerator(s) 1214, when combined with the CPU(s) 1206, the GPU(s) 1208, and the data store(s) 1216, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1220) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1208.

In some examples, a CNN for facial recognition and vehicle owner identification may use data from camera sensors to identify the presence of an authorized driver and/or owner of the vehicle 1200. The always on sensor processing engine may be used to unlock the vehicle when the owner approaches the driver door and turn on the lights, and, in security mode, to disable the vehicle when the owner leaves the vehicle. In this way, the SoC(s) 1204 provide for security against theft and/or carjacking.

In another example, a CNN for emergency vehicle detection and identification may use data from microphones 1296 to detect and identify emergency vehicle sirens. In contrast to conventional systems, that use general classifiers to detect sirens and manually extract features, the SoC(s) 1204 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1258. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1262, until the emergency vehicle(s) passes.

The vehicle may include a CPU(s) 1218 (e.g., discrete CPU(s), or dCPU(s)), that may be coupled to the SoC(s) 1204 via a high-speed interconnect (e.g., PCIe). The CPU(s) 1218 may include an X86 processor, for example. The CPU(s) 1218 may be used to perform any of a variety of functions, including arbitrating potentially inconsistent results between ADAS sensors and the SoC(s) 1204, and/or monitoring the status and health of the controller(s) 1236 and/or infotainment SoC 1230, for example.

The vehicle 1200 may include a GPU(s) 1220 (e.g., discrete GPU(s), or dGPU(s)), that may be coupled to the SoC(s) 1204 via a high-speed interconnect (e.g., NVIDIA's NVLINK). The GPU(s) 1220 may provide additional artificial intelligence functionality, such as by executing redundant and/or different neural networks, and may be used to train and/or update neural networks based on input (e.g., sensor data) from sensors of the vehicle 1200.

The vehicle 1200 may further include the network interface 1224 which may include one or more wireless antennas 1226 (e.g., one or more wireless antennas for different communication protocols, such as a cellular antenna, a Bluetooth antenna, etc.). The network interface 1224 may be used to enable wireless connectivity over the Internet with the cloud (e.g., with the server(s) 1278 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1200 information about vehicles in proximity to the vehicle 1200 (e.g., vehicles in front of, on the side of, and/or behind the vehicle 1200). This functionality may be part of a cooperative adaptive cruise control functionality of the vehicle 1200.

The network interface 1224 may include a SoC that provides modulation and demodulation functionality and enables the controller(s) 1236 to communicate over wireless networks. The network interface 1224 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1200 may further include data store(s) 1228 which may include off-chip (e.g., off the SoC(s) 1204) storage. The data store(s) 1228 may include one or more storage elements including RAM, SRAM, DRAM, VRAM, Flash, hard disks, and/or other components and/or devices that may store at least one bit of data.

The vehicle 1200 may further include GNSS sensor(s) 1258. The GNSS sensor(s) 1258 (e.g., GPS and/or assisted GPS sensors), to assist in mapping, perception, occupancy grid generation, and/or path planning functions. Any number of GNSS sensor(s) 1258 may be used, including, for example and without limitation, a GPS using a USB connector with an Ethernet to Serial (RS-232) bridge.

The vehicle 1200 may further include RADAR sensor(s) 1260. The RADAR sensor(s) 1260 may be used by the vehicle 1200 for long-range vehicle detection, even in darkness and/or severe weather conditions. RADAR functional safety levels may be ASIL B. The RADAR sensor(s) 1260 may use the CAN and/or the bus 1202 (e.g., to transmit data generated by the RADAR sensor(s) 1260) for control and to access object tracking data, with access to Ethernet to access raw data in some examples. A wide variety of RADAR sensor types may be used. For example, and without limitation, the RADAR sensor(s) 1260 may be suitable for front, rear, and side RADAR use. In some example, Pulse Doppler RADAR sensor(s) are used.

The RADAR sensor(s) 1260 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1260 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1200 surroundings at higher speeds with minimal interference from traffic in adjacent lanes. The other two antennae may expand the field of view, making it possible to quickly detect vehicles entering or leaving the vehicle's 1200 lane.

Mid-range RADAR systems may include, as an example, a range of up to 1260 m (front) or 80 m (rear), and a field of view of up to 42 degrees (front) or 1250 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1200 may further include ultrasonic sensor(s) 1262. The ultrasonic sensor(s) 1262, which may be positioned at the front, back, and/or the sides of the vehicle 1200, may be used for park assist and/or to create and update an occupancy grid. A wide variety of ultrasonic sensor(s) 1262 may be used, and different ultrasonic sensor(s) 1262 may be used for different ranges of detection (e.g., 2.5 m, 4 m). The ultrasonic sensor(s) 1262 may operate at functional safety levels of ASIL B.

The vehicle 1200 may include LIDAR sensor(s) 1264. The LIDAR sensor(s) 1264 may be used for object and pedestrian detection, emergency braking, collision avoidance, and/or other functions. The LIDAR sensor(s) 1264 may be functional safety level ASIL B. In some examples, the vehicle 1200 may include multiple LIDAR sensors 1264 (e.g., two, four, six, etc.) that may use Ethernet (e.g., to provide data to a Gigabit Ethernet switch).

In some examples, the LIDAR sensor(s) 1264 may be capable of providing a list of objects and their distances for a 360-degree field of view. Commercially available LIDAR sensor(s) 1264 may have an advertised range of approximately 1200 m, with an accuracy of 2 cm-3 cm, and with support for a 1200 Mbps Ethernet connection, for example. In some examples, one or more non-protruding LIDAR sensors 1264 may be used. In such examples, the LIDAR sensor(s) 1264 may be implemented as a small device that may be embedded into the front, rear, sides, and/or corners of the vehicle 1200. The LIDAR sensor(s) 1264, in such examples, may provide up to a 1220-degree horizontal and 35-degree vertical field-of-view, with a 200 m range even for low-reflectivity objects. Front-mounted LIDAR sensor(s) 1264 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1200. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1264 may be less susceptible to motion blur, vibration, and/or shock.

The vehicle may further include IMU sensor(s) 1266. The IMU sensor(s) 1266 may be located at a center of the rear axle of the vehicle 1200, in some examples. The IMU sensor(s) 1266 may include, for example and without limitation, an accelerometer(s), a magnetometer(s), a gyroscope(s), a magnetic compass(es), and/or other sensor types. In some examples, such as in six-axis applications, the IMU sensor(s) 1266 may include accelerometers and gyroscopes, while in nine-axis applications, the IMU sensor(s) 1266 may include accelerometers, gyroscopes, and magnetometers.

In some embodiments, the IMU sensor(s) 1266 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1266 may enable the vehicle 1200 to estimate heading without requiring input from a magnetic sensor by directly observing and correlating the changes in velocity from GPS to the IMU sensor(s) 1266. In some examples, the IMU sensor(s) 1266 and the GNSS sensor(s) 1258 may be combined in a single integrated unit.

The vehicle may include microphone(s) 1296 placed in and/or around the vehicle 1200. The microphone(s) 1296 may be used for emergency vehicle detection and identification, among other things.

The vehicle may further include any number of camera types, including stereo camera(s) 1268, wide-view camera(s) 1270, infrared camera(s) 1272, surround camera(s) 1274, long-range and/or mid-range camera(s) 1298, and/or other camera types. The cameras may be used to capture image data around an entire periphery of the vehicle 1200. The types of cameras used depends on the embodiments and requirements for the vehicle 1200, and any combination of camera types may be used to provide the necessary coverage around the vehicle 1200. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 12A and FIG. 12B.

The vehicle 1200 may further include vibration sensor(s) 1242. The vibration sensor(s) 1242 may measure vibrations of components of the vehicle, such as the axle(s). For example, changes in vibrations may indicate a change in road surfaces. In another example, when two or more vibration sensors 1242 are used, the differences between the vibrations may be used to determine friction or slippage of the road surface (e.g., when the difference in vibration is between a power-driven axle and a freely rotating axle).

The vehicle 1200 may include an ADAS system 1238. The ADAS system 1238 may include a SoC, in some examples. The ADAS system 1238 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1260, LIDAR sensor(s) 1264, and/or a camera(s). The ACC systems may include longitudinal ACC and/or lateral ACC. Longitudinal ACC monitors and controls the distance to the vehicle immediately ahead of the vehicle 1200 and automatically adjust the vehicle speed to maintain a safe distance from vehicles ahead. Lateral ACC performs distance keeping, and advises the vehicle 1200 to change lanes when necessary. Lateral ACC is related to other ADAS applications such as LCA and CWS.

CACC uses information from other vehicles that may be received via the network interface 1224 and/or the wireless antenna(s) 1226 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1200), while the I2V communication concept provides information about traffic further ahead. CACC systems may include either or both I2V and V2V information sources. Given the information of the vehicles ahead of the vehicle 1200, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1260, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1260, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1200 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1200 if the vehicle 1200 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1260, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1200 is backing up. Some RCTW systems include AEB to ensure that the vehicle brakes are applied to avoid a crash. RCTW systems may use one or more rear-facing RADAR sensor(s) 1260, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1200, the vehicle 1200 itself must, in the case of conflicting results, decide whether to heed the result from a primary computer or a secondary computer (e.g., a first controller 1236 or a second controller 1236). For example, in some embodiments, the ADAS system 1238 may be a backup and/or secondary computer for providing perception information to a backup computer rationality module. The backup computer rationality monitor may run a redundant diverse software on hardware components to detect faults in perception and dynamic driving tasks. Outputs from the ADAS system 1238 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1204.

In other examples, ADAS system 1238 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1238 may be fed into the primary computer's perception block and/or the primary computer's dynamic driving task block. For example, if the ADAS system 1238 indicates a forward crash warning due to an object immediately ahead, the perception block may use this information when identifying objects. In other examples, the secondary computer may have its own neural network which is trained and thus reduces the risk of false positives, as described herein.

The vehicle 1200 may further include the infotainment SoC 1230 (e.g., an in-vehicle infotainment system (IVI)). Although illustrated and described as a SoC, the infotainment system may not be a SoC, and may include two or more discrete components. The infotainment SoC 1230 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1200. For example, the infotainment SoC 1230 may radios, disk players, navigation systems, video players, USB and Bluetooth connectivity, carputers, in-car entertainment, Wi-Fi, steering wheel audio controls, hands free voice control, a heads-up display (HUD), an HMI display 1234, a telematics device, a control panel (e.g., for controlling and/or interacting with various components, features, and/or systems), and/or other components. The infotainment SoC 1230 may further be used to provide information (e.g., visual and/or audible) to a user(s) of the vehicle, such as information from the ADAS system 1238, autonomous driving information such as planned vehicle maneuvers, trajectories, surrounding environment information (e.g., intersection information, vehicle information, road information, etc.), and/or other information.

The infotainment SoC 1230 may include GPU functionality. The infotainment SoC 1230 may communicate over the bus 1202 (e.g., CAN bus, Ethernet, etc.) with other devices, systems, and/or components of the vehicle 1200. In some examples, the infotainment SoC 1230 may be coupled to a supervisory MCU such that the GPU of the infotainment system may perform some self-driving functions in the event that the primary controller(s) 1236 (e.g., the primary and/or backup computers of the vehicle 1200) fail. In such an example, the infotainment SoC 1230 may put the vehicle 1200 into a chauffeur to safe stop mode, as described herein.

The vehicle 1200 may further include an instrument cluster 1232 (e.g., a digital dash, an electronic instrument cluster, a digital instrument panel, etc.). The instrument cluster 1232 may include a controller and/or supercomputer (e.g., a discrete controller or supercomputer). The instrument cluster 1232 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1230 and the instrument cluster 1232. In other words, the instrument cluster 1232 may be included as part of the infotainment SoC 1230, or vice versa.

Figure 12D:
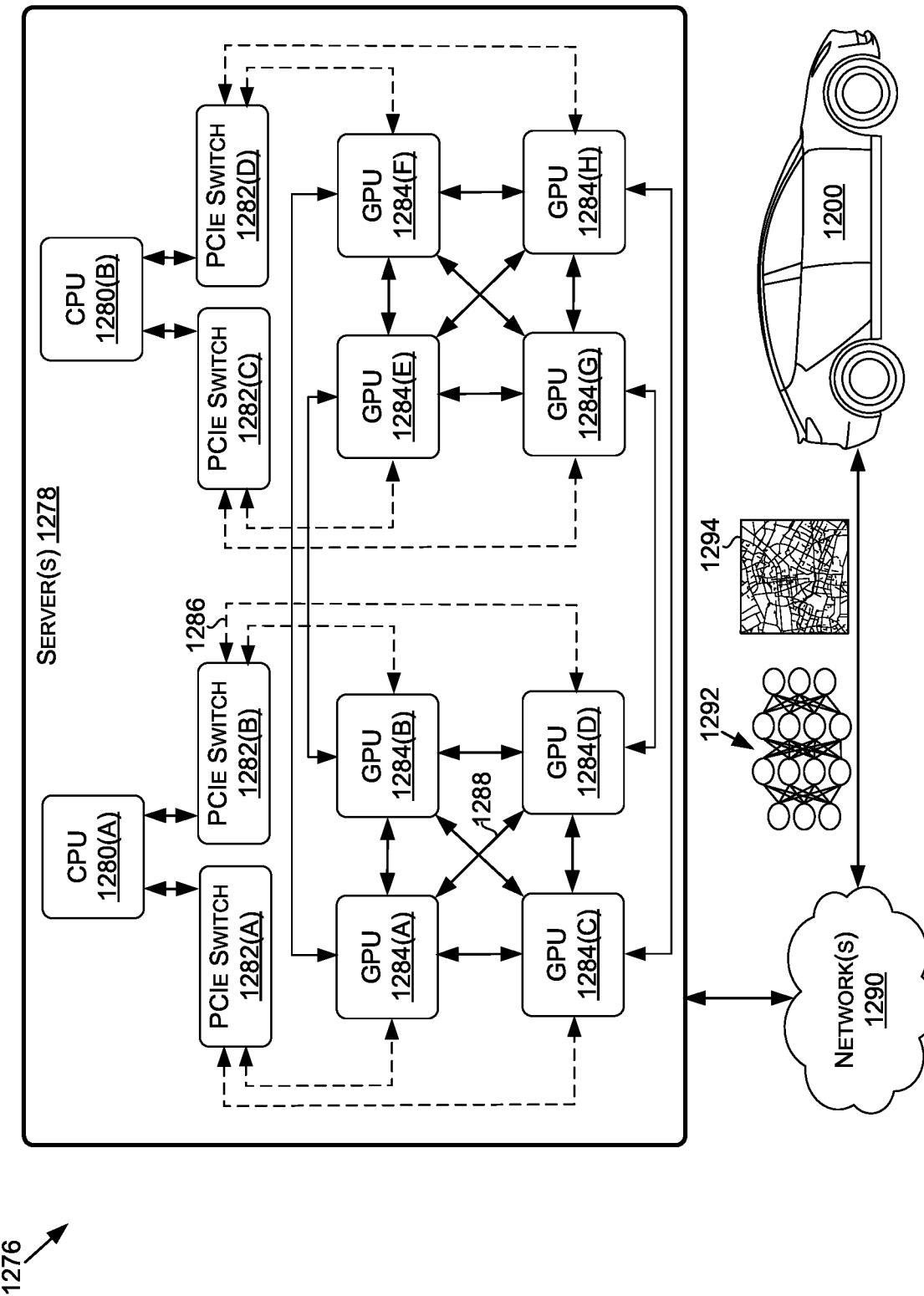
FIG. 12D is a system diagram for communication between cloud-based server(s) and the example autonomous vehicle of FIG. 12A, in accordance with some embodiments of the present disclosure.

FIG. 12D is a system diagram for communication between cloud-based server(s) and the example autonomous vehicle 1200 of FIG. 12A, in accordance with some embodiments of the present disclosure. The system 1276 may include server(s) 1278, network(s) 1290, and vehicles, including the vehicle 1200. The server(s) 1278 may include a plurality of GPUs 1284(A)-1284(H) (collectively referred to herein as GPUs 1284), PCIe switches 1282(A)-1282(H)

(collectively referred to herein as PCIe switches 1282), and/or CPUs 1280(A)-1280(B) (collectively referred to herein as CPUs 1280). The GPUs 1284, the CPUs 1280, and the PCIe switches may be interconnected with high-speed interconnects such as, for example and without limitation, NVLink interfaces 1288 developed by NVIDIA and/or PCIe connections 1286. In some examples, the GPUs 1284 are connected via NVLink and/or NVSwitch SoC and the GPUs 1284 and the PCIe switches 1282 are connected via PCIe interconnects. Although eight GPUs 1284, two CPUs 1280, and two PCIe switches are illustrated, this is not intended to be limiting. Depending on the embodiment, each of the server(s) 1278 may include any number of GPUs 1284, CPUs 1280, and/or PCIe switches. For example, the server(s) 1278 may each include eight, sixteen, thirty-two, and/or more GPUs 1284.

The server(s) 1278 may receive, over the network(s) 1290 and from the vehicles, image data representative of images showing unexpected or changed road conditions, such as recently commenced road-work. The server(s) 1278 may transmit, over the network(s) 1290 and to the vehicles, neural networks 1292, updated neural networks 1292, and/or map information 1294, including information regarding traffic and road conditions. The updates to the map information 1294 may include updates for the HD map 1222, such as information regarding construction sites, potholes, detours, flooding, and/or other obstructions. In some examples, the neural networks 1292, the updated neural networks 1292, and/or the map information 1294 may have resulted from new training and/or experiences represented in data received from any number of vehicles in the environment, and/or based on training performed at a datacenter (e.g., using the server(s) 1278 and/or other servers).

The server(s) 1278 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1290, and/or the machine learning models may be used by the server(s) 1278 to remotely monitor the vehicles.

In some examples, the server(s) 1278 may receive data from the vehicles and apply the data to up-to-date real-time neural networks for real-time intelligent inferencing. The server(s) 1278 may include deep-learning supercomputers and/or dedicated AI computers powered by GPU(s) 1284, such as a DGX and DGX Station machines developed by NVIDIA. However, in some examples, the server(s) 1278 may include deep learning infrastructure that use only CPU-powered datacenters.

The deep-learning infrastructure of the server(s) 1278 may be capable of fast, real-time inferencing, and may use that capability to evaluate and verify the health of the processors, software, and/or associated hardware in the vehicle 1200. For example, the deep-learning infrastructure may receive periodic updates from the vehicle 1200, such as a sequence of images and/or objects that the vehicle 1200 has located in that sequence of images (e.g., via computer vision and/or other machine learning object classification techniques). The deep-learning infrastructure may run its own neural network to identify the objects and compare them with the objects identified by the vehicle 1200 and, if the results do not match and the infrastructure concludes that the AI in the vehicle 1200 is malfunctioning, the server(s) 1278 may transmit a signal to the vehicle 1200 instructing a fail-safe computer of the vehicle 1200 to assume control, notify the passengers, and complete a safe parking maneuver.

For inferencing, the server(s) 1278 may include the GPU(s) 1284 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Figure 13:
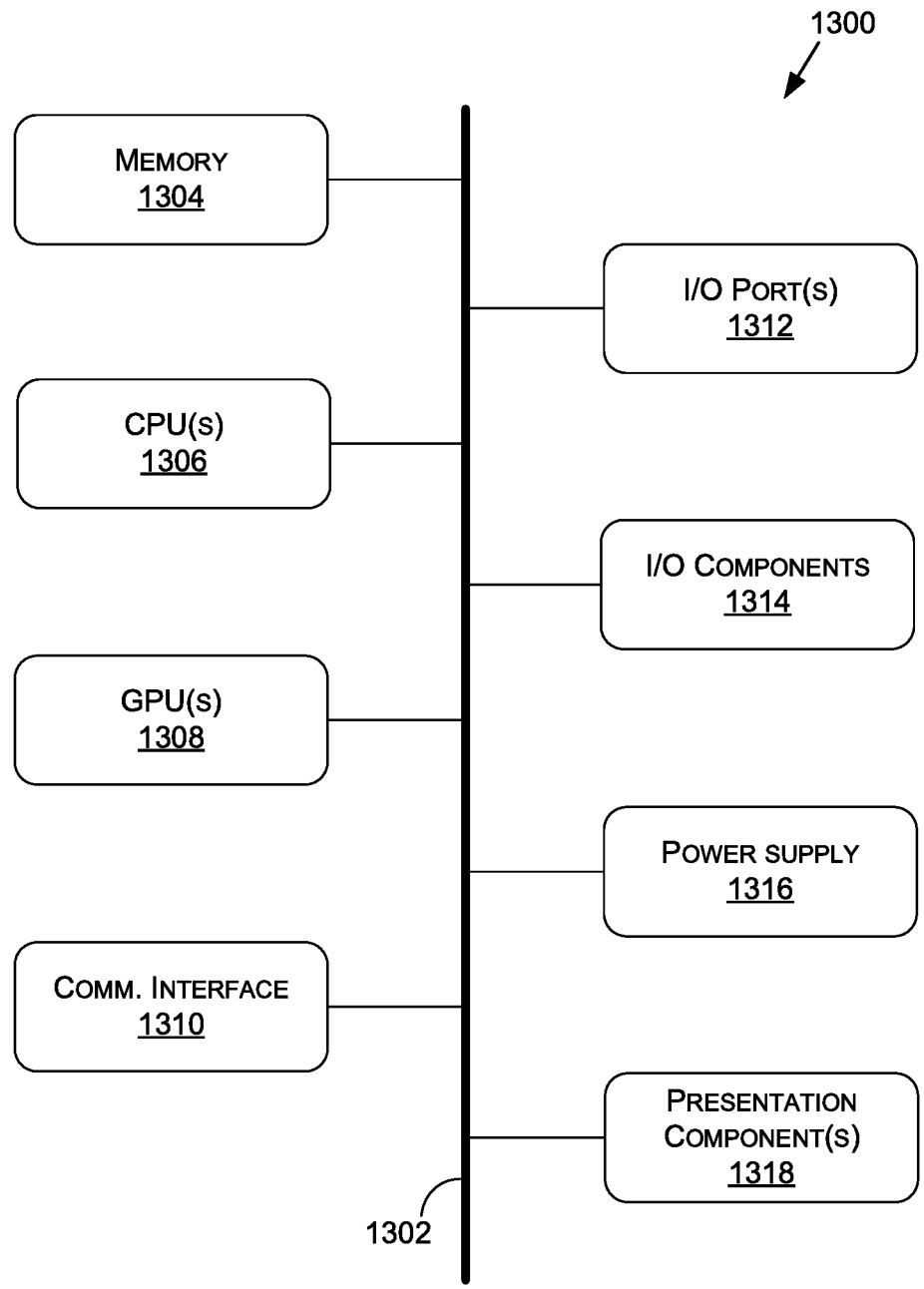
FIG. 13 is a block diagram of an example computing device suitable for use in implementing some embodiments of the present disclosure.

FIG. 13 is a block diagram of an example computing device 1300 suitable for use in implementing some embodiments of the present disclosure. Computing device 1300 may include a bus 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, and one or more presentation components 1318 (e.g., display(s)).

Although the various blocks of FIG. 13 are shown as connected via the bus 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The bus 1302 may represent one or more busses, such as an address bus, a data bus, a control bus, or a combination thereof. The bus 1302 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an ARM processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

The GPU(s) 1308 may be used by the computing device 1300 to render graphics (e.g., 3D graphics). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data. The display memory may be included as part of the memory 1304. The GPU(s) 708 may include two or more GPUs operating in parallel (e.g., via a link). When combined together, each GPU 1308 may generate pixel data for different portions of an output image or for different output images (e.g., a first GPU for a first image and a second GPU for a second image). Each GPU may include its own memory, or may share memory with other GPUs.

In examples where the computing device 1300 does not include the GPU(s) 1308, the CPU(s) 1306 may be used to render graphics.

The communication interface 1310 may include one or more receivers, transmitters, and/or transceivers that enable the computing device 700 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
receiving, using a security engine in a virtualized environment, a network communication over a communication channel of a plurality of communication channels, the communication channel being between an entity external to the virtualized environment and a guest operating system (OS) of guest OSes instantiated in the virtualized environment, wherein the plurality of communication channels is provided using the virtualized environment to respective one or more of the guest OSes over a shared connection to a network interface external to the virtualized environment;
determining, by the security engine, the network communication is part of a security event representing a security threat over the communication channel based at least on analyzing the network communication;
based at least in part on the determining the security event, determining one or more quality of service (QoS) parameters to limit network resources available to the communication channel relative to others of the communication channels; and
delaying dispatch of one or more messages intercepted on the communication channel based at least on the one or more QoS parameters.

2. The method of claim 1, further comprising:
computing a length of a delay for the one or more messages over the communication channel based at least on the one or more QoS parameters, wherein the delaying the dispatch includes applying the delay to the dispatch is based at least on the length of the delay.

3. The method of claim 1, further comprising tagging the one or more messages with one or more QoS tags corresponding to the one or more QoS parameters, wherein network infrastructure external to the virtualized environment processes the one or more messages using the one or more QoS tags.

4. The method of claim 1, wherein the security engine is instantiated on a first partition in the virtualized environment, the guest OS is instantiated on a second partition in the virtualized environment, and a hypervisor of the virtualized environment is instantiated on a third partition in the virtualized environment.

5. The method of claim 1, wherein the determining the network communication corresponds to the security event includes determining the security event comprises a Denial-of-Service (DoS) attack over the communication channel.

6. The method of claim 1, further comprising deactivating a QoS handler of the security engine that causes the delaying of the dispatch based at least on determining an end to the security event, the deactivating causing an end to the delaying of the dispatch by the security engine.

7. The method of claim 1, wherein the network interface comprises a virtualized hardware interface and the communication channel provides the guest OS with connectivity to a network communication channel of a vehicle through the virtualized hardware interface.

8. A system comprising:
one or more circuits to perform operations including:
intercepting, using a virtualized environment, a network communication over a communication channel of communication channels, the communication channel being between an entity external to the virtualized environment and a guest operating system (OS) of guest OSes instantiated in the virtualized environment, wherein the communication channels are provided using in the virtualized environment to respective one or more of the guest OSes over a shared connection to a network interface external to the virtualized environment;
determining, using the virtualized environment, the network communication is part of a security event representing a security threat over the communication channel based at least on analyzing the network communication;
based at least on the determining the security event, determining one or more quality of service (QoS) parameters to add a delay to dispatch of one or more messages received over the communication channel; and
adding the delay to the dispatch of the one or more messages received over the communication channel based at least on the one or more QoS parameters.

9. The system of claim 8, wherein the operations include computing the delay based at least on the one or more QoS parameters.

10. The system of claim 8, wherein the one or more QoS parameters limit network resources available to the communication channel based at least on the adding of the delay introducing a new source of latency into the communication channel.

11. The system of claim 8, further comprising, based at least on the determining the security event, activating a QoS handler to apply the delay to the dispatch.

12. The system of claim 8, wherein the network interface comprises a virtualized hardware interface and the communication channel provides the guest OS with connectivity to a network communication channel of a vehicle through the virtualized hardware interface.

13. The system of claim 8, further comprising deactivating a QoS handler used to apply the delay to the one or more QoS parameters based at least on determining an end to the security event.

14. The system of claim 8, wherein the intercepting of the communication, the determining of the one or more QoS parameters, and the adding of the delay are performed by a virtualized component hosted using a hypervisor in an execution environment that is isolated from the guest OS, the virtualized component being between the hypervisor and the Guest OS on situated on the communication channel.

15. A processor comprising:
one or more circuits to analyze, in a virtualized environment, a communication from a communication channel of communication channels, the communication channel being between an entity external to the virtualized environment and a guest operating system (OS) instantiated in the virtualized environment to determine the communication is part of a security event representing a security threat over the communication channel, determine one or more quality of service (QoS) parameters to introduce a delay to one or more messages intercepted on the communication channel, and apply the delay to the one or more messages, wherein the communication channel is provided using the virtualized environment to a network interface external to the virtualized environment.

16. The processor of claim 15, wherein the one or more circuits compute the delay based at least on the one or more QoS parameters.

17. The processor of claim 15, wherein the one or more QoS parameters limit network resources available to the communication channel by reducing bandwidth allocated to the communication channel.

18. The processor of claim 15, wherein the one or more circuits are further to based at least on the determining the security event, activate a QoS handler to apply the delay.

19. The processor of claim 15, wherein the security event corresponds to a Denial-of-Service (DoS) attack over the communication channel.

20. The processor of claim 15, wherein the one or more circuits are further to deactivate a QoS handler used to apply the delay based at least on determining an end to the security event.

* * * * *